US012313409B2

(12) United States Patent
Faragher et al.

(10) Patent No.: US 12,313,409 B2
(45) Date of Patent: May 27, 2025

(54) METHOD OF ESTIMATING A METRIC OF INTEREST RELATED TO THE MOTION OF A BODY

(71) Applicant: Focal Point Positioning Limited, Cambridge (GB)

(72) Inventors: Ramsey Faragher, Cambridge (GB); Robert Mark Crockett, Hertfordshire (GB); Peter Duffett-Smith, Huntingdon (GB)

(73) Assignee: FOCAL POINT POSITIONING LIMITED, Cambridge (GB)

( * ) Notice: Subject to any disclaimer, the term of this patent is extended or adjusted under 35 U.S.C. 154(b) by 1005 days.

(21) Appl. No.: 17/227,564

(22) Filed: Apr. 12, 2021

(65) Prior Publication Data

US 2021/0254979 A1  Aug. 19, 2021

Related U.S. Application Data

(63) Continuation of application No. PCT/GB2019/052901, filed on Oct. 11, 2019.

(30) Foreign Application Priority Data

Oct. 12, 2018  (GB) ..................................... 1816655
Apr. 18, 2019  (GB) ..................................... 1905586

(51) Int. Cl.
*G01C 21/16* (2006.01)
*G01C 21/20* (2006.01)
(Continued)

(52) U.S. Cl.
CPC ..... *G01C 21/1654* (2020.08); *G01C 21/1652* (2020.08); *G01C 21/1656* (2020.08);
(Continued)

(58) Field of Classification Search
CPC ..... G01S 19/47; G01S 19/49; G01C 21/1652; G01C 21/20; G06F 3/011
See application file for complete search history.

(56) References Cited

U.S. PATENT DOCUMENTS 5,919,239 A * 7/1999 Fraker ..................... G01S 19/07
701/541
9,780,829 B1  10/2017 Faragher et al.
(Continued)

FOREIGN PATENT DOCUMENTS

CN  106595653 A  4/2017
CN  104898148 B  8/2017
(Continued)

OTHER PUBLICATIONS

J.R. Clynch, The Global Positioning System, https://www.oc.nps.edu/oc2902w/gps/gpsoview.htm, 8 pages (Year: 2003).*
(Continued)

*Primary Examiner* — Bernarr E Gregory
*Assistant Examiner* — Fred H Mull
(74) *Attorney, Agent, or Firm* — MOSER TABOA

(57) ABSTRACT

There is disclosed a computer-implemented method performed in a tracking system for tracking the motion of a body, as a function of time, the method comprising: (a) during a first time period, obtaining first data related to the motion of a body from at least one primary positioning unit, wherein said at least one primary positioning unit is mounted on a first platform carried on the body, or wherein said at least one primary positioning unit is separate to the body, said primary positioning unit being operational during the first time period; (b) during the first time period, obtaining second data from one or more secondary sensors configured to make measurements from which position or movement may be determined, said one or more secondary sensors being mounted on one or more second platforms
(Continued)

carried on the body; (c) generating first training data comprising the first data and second data; (d) during a second time period, obtaining third data from the one or more secondary sensors, and; (e) analysing the third data to estimate at least one first metric related to the motion of the body during the second time period using a first algorithm trained using the first training data. A tracking system for tracking the motion of a body, as a function of time, is also disclosed.

41 Claims, 11 Drawing Sheets

(51) Int. Cl.
    *G01S 19/49*          (2010.01)
    *G06F 3/01*           (2006.01)
    *G06F 3/0481*       (2022.01)

(52) U.S. Cl.
    CPC .............. *G01C 21/20* (2013.01); *G06F 3/011* (2013.01); *G01S 19/49* (2013.01); *G06F 3/0481* (2013.01)

(56) References Cited

U.S. PATENT DOCUMENTS

| | | | |
|---|---|---|---|
| 10,321,430 B2 | 6/2019 | Faragher et al. | |
| 10,816,672 B2 | 10/2020 | Faragher et al. | |
| 2010/0100320 A1* | 4/2010 | Yu | G01S 19/34 701/469 |
| 2010/0176950 A1* | 7/2010 | Bartholf | G07F 9/026 340/572.1 |
| 2014/0329521 A1* | 11/2014 | Stauder | H04L 69/18 455/552.1 |
| 2016/0210761 A1* | 7/2016 | Pollefeys | G06T 7/55 |
| 2018/0087903 A1* | 3/2018 | Werner | G01S 19/49 |
| 2019/0086553 A1 | 3/2019 | Faragher et al. | |
| 2019/0128673 A1 | 5/2019 | Faragher et al. | |
| 2020/0264317 A1 | 8/2020 | Faragher et al. | |
| 2020/0319347 A1 | 10/2020 | Faragher et al. | |

FOREIGN PATENT DOCUMENTS

| | | | | |
|---|---|---|---|---|
| EP | 3708953 A1 | * | 9/2020 | ......... G01C 21/1654 |
| JP | 2015-094690 | | 5/2015 | |

OTHER PUBLICATIONS

B.H. Kaygsz et al., Enhancing positioning accuracy of GPS/INS system during GPS outages utilizing artificial neural network, Neural Processing Letters, vol. 25, p. 171-186 (Year: 2007).*
G.T. Schmidt et al., INS/GPS Integration Architectures, RTO-EN-SET-116(2010), Massachusetts Institute of Technology, p. 5-1 to 5-18 (Year: 2010).*
X. Tao et al., An Outlier Detection Method of GNSS/SINS Integrated Navigation Based on Accelerometer Bias Stability, Geomatics and Information Science of Wuhan University, vol. 43(7), p. 1078-1084, Jul. 2018 (Year: 2018).*
Combined Search and Examination Report and Written Opinion in United Kingdom Patent Application No. GB1905586.2 dated Feb. 25, 2020, 11 pages.
Gao et al., "An integrated land vehicle navigation system based on context awareness." GPS solutions 20.3 (2016): 509-524.
International Preliminary Report on Patentability in International Patent Application No. PCT/GB2019/052901 mailed Apr. 13, 2021, 33 pages.
International Search Report and Written Opinion in International Patent Application No. PCT/GB2019/052901 mailed Jan. 24, 2020, 19 pages.
Written Opinion of the International Preliminary Examining Authority in International Patent Application No. PCT/GB2019/052901 mailed Sep. 17, 2020, 7 pages.
Zhang et al., "A new method of seamless land navigation for GPS/INS integrated system." Measurement 45.4 (2012): 691-701.

* cited by examiner

METHOD OF ESTIMATING A METRIC OF INTEREST RELATED TO THE MOTION OF A BODY

CROSS-REFERENCE TO RELATED APPLICATIONS

This application is a bypass continuation of International Application No. PCT/GB2019/052901, filed on Oct. 11, 2019, which in turn claims priority to GB Application No. 1905586.2, filed on Apr. 18, 2019, and GB Application No. 1816655.3, filed on Oct. 12, 2018. Each of these applications is incorporated herein by reference in its entirety.

FIELD OF THE INVENTION

The present invention is directed to a method and system for estimating a metric of interest related to the motion of a body. The invention has particular application in the field of tracking and navigation.

BACKGROUND TO THE INVENTION

A traditional inertial navigation system uses standard mechanics equations to convert measurements from inertial sensors (for example accelerometers, gyroscopes etc.) into tracking and navigation data, such as velocity, orientation and position. A known problem with such a system is that of numerical integration error, which manifests as rapidly increasing errors in the derived tracking and navigation data. The inertial navigation equations typically involve the determination of orientation, velocity and position through numerical integration of successive rotation-rate and acceleration measurements. The integration of measurement errors results in an ever increasing velocity error (for example, due to sensor noise, biases, scale-factor and alignment errors), which in turn is accumulated into an even more rapidly-increasing position error. The effects of numerical integration error are particularly pronounced in the case of low-cost inertial measurement units (IMUs), the sensors of which are relatively noisy, possess large alignment and scale-factor errors, and have biases which may drift significantly over time or with changes in temperature.

The availability of low-cost IMUs is becoming more widespread and, as such, positioning, navigation and tracking systems are becoming more commonplace, for example in smart devices such as smart phones and fitness trackers. However, these low cost IMUs are generally of relatively low quality which means that the error drift is typically substantial, providing spurious and unhelpful results to a user. Global Navigation Satellite System (GNSS) receivers (such as GPS and GLONASS and Galileo) may be used in combination with IMUs in order to help improve the accuracy of the navigation solution. However, GNSS coverage is not always readily available (for example inside buildings) and GNSS units themselves may provide inaccurate navigation data in certain situations, for example in "urban canyons" where tall buildings may block visibility to the satellite constellation.

Furthermore, smart devices such as smart phones may be carried in a variety of different positions and orientations with respect to the user, who may frequently change his or her manner of motion. For example, a smart phone user may start a journey by walking with the smart phone positioned in a pocket. On receipt of a call, the phone may be moved to the user's ear, during which time the user has to run for a bus, after which the user spends the remainder of the journey travelling by bus. Such changes in motion of the user and relative position and orientation of the device with respect to the user can introduce further error into the final navigation solution in comparison to, for example, "strap-down" systems (where highly accurate IMUs are provided in fixed positions and orientations with respect to their host body) or gimballed systems.

Nevertheless, users of tracking and navigation systems using low cost IMUs still demand accurate and reliable positioning, tracking and navigation information, and there is therefore a requirement in the art to solve the problems outlined above. In particular, there is a requirement to provide accurate positioning, tracking and navigation systems in situations when GNSS positioning data is inaccurate or unavailable.

SUMMARY OF THE INVENTION

In accordance with a first aspect of the invention there is provided a computer-implemented method performed in a tracking system for tracking the motion of a body, as a function of time, the method comprising: (a) during a first time period, obtaining first data related to the motion of a body from at least one primary positioning unit, wherein said at least one primary positioning unit is mounted on a first platform carried on the body, or wherein said at least one primary positioning unit is separate to the body, said primary positioning unit being operational during the first time period; (b) during the first time period, obtaining second data from one or more secondary sensors configured to make measurements from which position or movement may be determined, said one or more secondary sensors being mounted on one or more second platforms carried on the body; (c) generating first training data comprising the first data and second data; (d) during a second time period, obtaining third data from the one or more secondary sensors, and; (e) analysing the third data to estimate at least one first metric related to the motion of the body during the second time period using a first algorithm trained using the first training data.

The first data are typically obtained by a primary positioning unit mounted on a first platform carried on a body and the second data are typically obtained by one or more secondary sensors mounted on a second platform carried on the body. The second data may be obtained by secondary sensors mounted on a plurality of second platforms carried on the body. The first and second platforms are independent of each other. In other words, they are physically separate and are typically different devices. For example, and as will be explained in more detail herein, the first platform may be a smartphone comprising a GNSS sensor acting as a primary positioning unit and carried on the body, and the one or more second platforms may be a head-mounted headset, wearable glasses, foot-mounted platforms or wrist-mounted watch or fitness tracker comprising a suite of inertial sensors acting as secondary sensors.

The present invention advantageously allows the second platform(s) to provide reliable estimates of a first metric of interest using data obtained only from its secondary sensors through the use of an algorithm trained using the first training data. As will be explained in more detail below, the first metric is typically used to constrain a tracking solution (e.g. a trajectory) estimated through analysis of the third data. The use of the at least one first metric (which may be referred to as, or part of, a "motion model" for the body during the second time period) allows improved tracking solutions to be obtained in comparison to conventional techniques using such secondary sensors (e.g. dead-reckoning) that are typically only able to provide reliable tracking information for a few seconds before error drift makes estimates unusable.

The primary positioning unit may be separate to ("external to") the body; in other words not carried by the body. For example, the primary positioning unit may be an external camera (e.g. one or more CCTV cameras). Again, in such cases, the primary positioning unit and the one or more second platforms are independent of each other.

In some embodiments, the first data are obtained from at least one primary positioning unit mounted on said first platform and from at least one primary positioning unit that is separate to the body.

In general the body is any body whose motion may be desired to be tracked. The body is typically a human user, i.e. a pedestrian, but in embodiments may be a vehicle such an automobile or bicycle.

Typically, at least a part of the second time period does not overlap with the first time period. In other words, typically, the first and second time periods do not extend between the same time instances. Preferably, the first and second time periods do not overlap. Typically, the second time period is in the future with respect to the first time period, and therefore, the second time period occurs subsequently to the first time period. However, the first time period may be in the future with respect to the second time period, for example when the metric during the second time period is estimated in a post-processing scenario.

The first time period refers to any time period during which the primary positioning unit is operational, meaning that it is capable of providing measurements, and thus reliable first data may be obtained for providing the first training data. The second time period is typically (although not always) any time period where measurements from the primary positioning unit are not available or are deemed unreliable. In embodiments, during the second time period the first platform on which the primary positioning unit is mounted may not be carried by the body. During the second time period the first algorithm is required in order to estimate the desired first metric using data obtained from the one or more secondary sensors.

In general, the first and second time periods may occur in either order, may or may not be contiguous, and may or may not be from the same "journey" taken by the body. The first time period may vary in length from the order of seconds (e.g. 10 seconds) to one hour or longer. The invention allows for good estimation of the first metric during a second time period which may also range from seconds to hours, in contrast to conventional techniques such as dead-reckoning which may only provide a good metric of interest estimation for a few seconds.

Herein, the one or more secondary sensors are "secondary" sensors in that they do not provide positioning, tracking or navigation data directly; instead they provide measurements from which position or movement may be inferred. The at least one secondary sensor typically comprises an inertial sensor such as an accelerometer (typically adapted to measure linear acceleration) or gyroscope (typically adapted to measure rotational velocity). Other examples of such secondary sensors include magnetometers (typically adapted to measure a heading reference), and pressure-sensing devices such as barometers (typically adapted to measure changes in altitude). Another example of a secondary sensor that may be used is a camera that is not part of a dedicated camera- or visual odometry-based positioning system. In some embodiments, the secondary sensor may use the signals received from ground-based transmitters (such as the cellular transmitters) to deduce a heading and or speed, for example by measuring the Doppler shift of the received signals from the transmitters whose bearings relative to the sensor are known. The at least one secondary sensor is typically a part of an inertial navigation system.

The present invention is particularly suited to the use of micro electrical mechanical system (MEMs) sensors as secondary sensors. MEMs sensors are typically of low-cost and low quality causing large error drift, and generally not used in strapdown and gimballed systems. However, their low cost and widespread availability makes them commonly used in platforms such as smartphones and fitness trackers to which the present invention has particular application.

In contrast, the primary positioning unit provides position and navigation data directly, typically based on information received from sources external to the unit. One example of a primary positioning unit is a GNSS sensor, which receives external information from its respective satellite constellation. Other examples of a primary positioning unit include units adapted to provide positioning measurements based on local position recognition techniques, such as WiFi fingerprinting or visual recognition methods, or using the signals from other navigation and tracking systems such as those provided by the LORAN systems.

During the first time period, the primary positioning unit is operational, meaning that it is capable of providing trusted and reliable positioning and navigation data. This is typically because the primary positioning unit can receive the required external information during the first time period. Typically the primary positioning unit is operational during the entirety of the first time period. For example, in the case where the primary positioning unit comprises a GNSS sensor mounted on a first platform carried by the body, during the first time period, the platform is typically at a location where the GNSS sensor has good visibility of the satellite constellation and so can provide reliable velocity, position and timing information.

In embodiments, the first and second data may be obtained based from the at least one secondary sensor and at least one primary positioning unit using simulation techniques.

The one or more secondary sensors are mounted on one ore more second platforms. Typically, a second platform comprises only secondary sensors and does not comprise a primary positioning unit. Examples of secondary platforms that may be used in the present invention include a headset, wearable glasses, wearable devices (smartwatch, fitness tracker and other jewellery) and foot-mounted platforms.

Typically, during the second time period, the primary positioning unit is not operational. For example, in the case where the primary positioning unit comprises a GNSS sensor, during the second time period the GNSS sensor mounted on the first platform does not have adequate visibility of the satellite constellation. In embodiments in which the primary positioning unit is separate to the body (e.g. a closed-circuit television system), the second time period may be a period when the body is no longer within the (e.g. visual) scope of the primary positioning unit. Thus, typically, during the second time period, the third data are obtained only from the one or more secondary sensors. Indeed, in advantageous embodiments, during the first time period both the first and second platforms may be carried on the body, or the body is within the (e.g. visual) scope of a separate primary positioning unit, in order that the training data may be generated. During the second time period, only the second platform(s) may be carried by the body, with the metric estimated during the second time period using only the third data obtained from the one or more secondary sensors. This also takes advantage of the fact that the update rates for secondary sensors such as accelerometers and gyroscopes (and other inertial sensors) are typically much faster than for GNSS units (of the order 100 Hz for an inertial sensor as opposed to typically 1 Hz for GPS) enabling high time-resolution estimations of the metric of interest during the second time period.

Typically, the estimated at least one first metric during the second time period is at least one of the following: a direction of motion, a speed, a velocity, a motion context for the body, and a position context for the second platform with respect to the body. Thus, the first metric of interest may be (and in preferred embodiments, is) a velocity of the body. The at least one first metric may be considered to be a "motion model" of the body, and may in general comprise any parameter that quantitatively represents an aspect of the body's motion (for example a step length).

The first metric may be a desired solution; for example it may be that the velocity of the body is desired to be known at a particular time. However, particularly advantageously— and as will be described in more detail below—the method of the present invention allows the evolution of a metric of interest related to the motion of the body (typically a trajectory) to be estimated during the second time period through further analysis of the third data that is constrained by a series of first metrics obtained using the first algorithm during the second time period. In other words, the present invention uses a trained machine learning algorithm to estimate a motion model for the body during a second time period that may be used to constrain an estimation of the evolution of a metric of interest during that time period (e.g. a trajectory). The invention allows for a good estimate of such a trajectory during a second time period which may range from seconds to hours, in contrast to conventional techniques such as dead-reckoning which may only provide a good trajectory estimation for a few seconds due to error drift.

The use of a trained machine learning algorithm to estimate a first metric (motion model) during the second time period is particularly advantageous over conventional techniques that attempt to define a motion model using data obtained only in the present epoch. By training the first algorithm using training data obtained over a number of previously taken "journeys" taken by a user for example, the motion model for that user may become more refined over time, allowing for more accurate estimations of his trajectory in the second time period.

The inventors have found that the method of the present invention provides excellent estimations of a body's trajectory during the second time period in situations where the primary positioning unit is not operational, and in particular where the body and the second platform(s) are not in a conventional strapdown or gimballed arrangement. In other words, the method of the present invention provides a particular advantage in scenarios when the body and the second platform(s) have a non-predetermined motion relationship during the second time period. The second platform(s) may be seen to be carried by, and independently movable with respect to, a primary motion of body. For example, the present invention finds particular application in a scenario where the body is a pedestrian and the second platform is a wearable fitness tracker worn by the pedestrian, or a headset worn by the pedestrian. In such a scenario, although the second platform is carried by the pedestrian, it may be independently movable with respect to a primary motion of the pedestrian. For example, a fitness tracker worn on the wrist may move in response to an arm movement of the pedestrian, which is different from the direction in which the pedestrian is walking. Similarly, a headset may move with a pedestrian's head movement but may be independent of the direction of motion of the pedestrian. In particular, the second platform is independently movable with respect to a fixed point on the body. The fixed point is typically the centre of mass of the body. Typically the metric of interest is estimated for a fixed point, such as the centre of mass, of a body. The second platform may be said to be "flexibly carried by" or "flexibly connected to" the body. The second platform may be said to be arbitrarily orientated with respect to the body.

The one or more second platforms may be connected to the body in a temporary manner. The term "temporary" here is used to mean that the platform is easily moved (engaged/disengaged) with respect to the body—for example a second platform may be carried by a pedestrian for a short period of time (i.e. temporarily), or attached to a moving object such as a vehicle using a mount designed for temporary mounting.

In some preferred embodiments, the first metric estimated using the first algorithm in step (e) is the body's direction of motion only, with the speed of the body being estimated from the third data using techniques such as regression or integration of the data obtained from the at least one secondary sensor during the second time period. Estimating only the direction of motion using the first algorithm in step (e) advantageously reduces the use of computer resources compared to estimating further metrics of interest within the second time period using the first algorithm, as will be described further herein.

Typically the first algorithm may be used to estimate a direction of motion in the sensor frame of reference, i.e. a coordinate frame attached to the centre of mass of the secondary sensor or the second platform to which it is mounted. This metric (i.e. direction of motion in the sensor frame) may then be used to determine the direction of motion of the body in the navigation frame of reference (i.e. a coordinate frame through which the body is moving—typically the Earth frame), if the orientation of the sensor frame of reference with respect to the navigation frame of reference is known or can be determined. This offset between the sensor and navigation frames of reference may be determined by use of a magnetometer and/or a gyroscope acting as a secondary sensor in the second time period. The magnetometer and/or gyroscope may provide a heading in the navigation frame of the second platform to which the secondary sensor(s) are mounted, and thus the offset between the sensor and navigation frames can be measured.

Alternatively, the direction of motion in the navigation frame (e.g. as determined from GNSS if the primary positioning unit is operational during the second time period) may be aligned with the estimated direction of motion in the sensor frame of reference in order to determine the offset between the navigation and sensor frames of reference (and hence the orientation of the second platform) without the need for a magnetometer/gyroscope.

The use of the first algorithm to estimate the direction of motion in the sensor frame of reference (which can then be transformed into the navigation frame of reference) is a particular advantage of the present invention. This allows the body's velocity to be inferred from windows—or "snapshots" of data obtained from the at least one secondary sensor during the second time period (and input into to the first algorithm) without knowledge of past or future measurements or system states.

For completeness, it should be noted that the first algorithm may be trained to estimate the orientation of the second platform (and thus the direction of motion) in the navigation frame, e.g. by estimating roll, pitch and yaw of the second platform from accelerometer, magnetometer and gyroscope measurements obtained during the second time period.

Particularly preferably, the method further comprises analysing the third data to estimate the evolution of at least one second metric related to the motion of the body during the second time period, wherein the evolution of the at least one second metric is constrained by the at least one first metric ("motion model") estimated using the first algorithm. Typically the second metric is at least one of a position, an orientation and a velocity. The analysis of the third data (i.e. obtained from the one or more secondary sensors) in order to estimate the evolution of the at least one second metric typically initially comprises conventional inertial navigation techniques in order to infer the second metric from data obtained by the at least one secondary sensor. For example, data from an accelerometer may be integrated (while correcting for gravity) in order to infer a velocity, and integrated again in order to infer a position. The estimates of the second metric are then constrained using estimates of the first metric obtained using the first algorithm (i.e. constrained by a motion model). For example, the analysing the third data may comprise comparing said third data with the at least one first metric to obtain corrected third data, and wherein the estimation of the evolution of the second metric is based on said corrected third data. Preferably, the obtaining corrected second data comprises determining a measurement bias of the at least one secondary sensor and correcting for said measurement bias in order to obtain the corrected second data. In preferred embodiments, the estimation of the second metric is constrained by the at least one first metric using a Kalman filter.

The third data are analysed in order to estimate the evolution of the at least one second metric during the second time period. By "evolution", we mean the change of the second metric over time. Particularly preferably, the third data are analysed in order to estimate a trajectory of the body during the second time period (i.e. the evolution of the body's position over time during the second time period). Where the aim is to track the body's position in the navigation frame, it is usually sufficient to track the position of the secondary sensor(s) carried by the body if it is coincident with the desired positioning accuracy. For example, the position of a secondary sensor mounted on a headset worn by a pedestrian, or mounted on a portable tracking device, is typically a reliable indication of the position of the body.

Thus, a particular advantage of the present invention is that a tracking solution for the body during the second time period may be obtained even when the primary positioning unit is not operational or not even carried by the body, and in particular in scenarios where the second platform(s) and body are not in a conventional strapdown or gimballed relationship. For example, where the primary positioning unit comprises a GNSS sensor mounted on the first platform carried on the body and the body (e.g. a pedestrian) moves from an area with good satellite visibility to an area with poor or zero satellite visibility (such as indoors or within an "urban canyon"); during the time with poor or zero satellite visibility (the second time period), an accurate track of the body may therefore be maintained using the data obtained from the secondary sensor(s) mounted on the second platform(s), and the trained first algorithm.

Conventionally, efforts to estimate the evolution of a motion-related metric of interest of a body using only data from secondary sensors (e.g. inertial sensors) in non-strapdown or non-gimballed setups have proven to be unsatisfactory. As well as the fact that widely-available, low-cost inertial sensors are typically of low quality leading to particularly quick accumulation of error in dead-reckoning techniques, typical motion patterns of a body such as a pedestrian are not conducive to accurate motion estimates where the data is obtained from sensors on a platform carried by the body in a non-strapdown or non-gimballed manner. Taking the headset example discussed above, when the wearer turns his or her head, data from an inertial sensor such as an accelerometer may suggest that the pedestrian made a sudden acceleration in the direction of the head rotation. However, in reality, the pedestrian probably maintained a constant direction and speed of motion.

The present invention overcomes such issues at least in part by being robust against such "context changes" of the first and second platforms. This is particularly advantageous during the second time period.

Contexts may be classified into "position contexts" and "motion contexts". A motion context represents the modality of the motion of the body, described for example as stationary; walking; running; sprinting; jumping; dancing; kicking a ball; playing a game with a racquet; sidestepping; backstepping; crawling; climbing/descending stairs; escalator; lift; ladder; cycling; travelling in motor vehicle etc. Other motion contexts will be readily appreciated by one skilled in the art.

A position context is the manner in which the platform is carried by the body, and typically comprises a position of the platform on the body. Two position contexts differ if the platform moves through space in a different way. For example, left foot and right foot movements will be very similar, and therefore a platform mounted on a right foot or a left foot may be considered to have the same position context. However, a platform mounted on the dashboard of a car moves through space in a different way to a platform mounted on a foot, and thus would be considered to have a different position context. The position context relates to the exact motion the platform takes through space over time as the as a result of the body's motion. Examples of position contexts include: in hand/on wrist in front of body; in hand/on wrist swinging at side of body; in hand/on body adjacent the ear; upper arm; head; centre of shoulders/back/waist; hips; trouser side pocket; trouser back pocket; jacket pocket; backpack; handbag; thigh/knee; ankle/foot; mounted on a vehicle etc. Other position contexts will be readily appreciated by one skilled in the art.

Motion contexts and position contexts may be identified by patterns in the obtained data (the training data and/or the third data obtained during the second time period). For example, regular periodic accelerometer and gyroscope signals that are characteristic of a user's gait, and GNSS velocity measurements indicating speeds of around 1 to 10 m/s (if the primary positioning unit is operational), would infer a motion context of walking or running. As a further example, for a user in a moving vehicle, one would typically observe a noise-like signal from an accelerometer and gyroscope owing to vehicle vibration, and GNSS velocity measurements of between 5 and 120 kilometres per hour.

As a further example, consider the position contexts of a phone in a pocket verses a phone being carried adjacent the ear. In both cases we would observe periodic (approximately sinusoidal) accelerometer and gyroscope time series signals, the measured accelerations and rotations being characteristic of the pedestrian's gait. However, the amplitude of accelerations and rotations measured by a phone in the pocket would most likely be larger than the phone held at the ear—the phone in pocket is swinging back and forth with the leg, while the phone at the ear remains at roughly the same pitch and roll throughout the gait cycle. Furthermore, a phone in a trouser pocket will experience asymmetric accelerations on right and left foot strikes, with larger peak accelerations experienced on foot strikes on the same side of the body as the phone. In contrast the phone held at the ear will see roughly symmetric accelerations on left-right foot strikes, as it is held closer to the centre line of the body. A light sensor could also be used to help differentiate between being in a pocket and held by the ear. We might always expect the phone to be in darkness in the pocket, while during daylight hours, or under artificial light, the phone at the ear will detect relatively bright light levels (provided the light sensor isn't also pressed against the ear lobe).

The above examples illustrate obvious differences between time series signals that are easily discernible, even by a human observer. As will be appreciated, during training of the first algorithm using the first training data, the first algorithm may identify other less obvious features and combinations thereof which allow robust distinction between contexts.

The inventors have found that implementations where the first algorithm comprises a neural network are particularly robust against changes in position and motion context. Thus, in preferred embodiments, the first algorithm is a neural network. This "robustness" is typically achieved by obtaining first data and second data for a plurality of motion contexts for the body, and wherein a motion context of the body during the second time period corresponds substantially to a motion context during the first time period. Furthermore, the method typically comprises obtaining first data and second data for a plurality of position contexts for the one or more second platforms with respect to the body, and wherein a position context for the one or more second platforms with respect to the body during the second time period corresponds substantially to a position context during the first time period.

In other words, in preferred embodiments, a neural network is trained using first training data spanning a desired range of motion and position contexts, in particular for the one or more second platforms. When third data are obtained within this range of contexts, the trained neural network can be used to estimate at least one first metric related to the motion of the body during the second time period, with the first metric being at least one of a direction of motion, a speed, a velocity, a motion context for the body, and a position context for the second platform with respect to the body. The at least one first metric may then be used to constrain a tracking solution of the body during the second time period.

This is a particularly advantageous feature of the present invention, as neither the training data nor the third data need to be explicitly classified ("labelled") with respective motion and position contexts.

However, in some embodiments, the third data may be analysed to determine at least one of: (i) a position context of the one or more second platforms with respect to the body during the second time period, and; (ii) a motion context of the body during the second time period. Such explicit classification may be advantageous, particularly when first algorithms other than a neural network are used, such as algorithms based on Support Vector Machine and Support Vector Regression classification techniques. In some embodiments, the first algorithm used in step (e) is selected from a set of predetermined algorithms for estimating the at least one first metric, wherein the selection is based on the determined position context and determined motion context during the second time period. Based on the determination of the motion context and position context during the second time period, the first algorithm can be selected in step (e) based on the best maximum-likelihood method in order to estimate the first metric related to the motion of the body. In such embodiments the first metric is typically at least one of a direction of motion, a speed or a velocity. The selection of the first algorithm is typically based on a look-up table of motion and position contexts with their respective maximum-likelihood methods.

In such embodiments where the third data are analysed in order to determine a position and/or motion context, the determination may be performed by a second and/or third machine learning algorithm (e.g. different from the first machine learning algorithm). Such second and/or third algorithms are typically machine learning algorithms based on techniques such as neural networks and/or Support Vector Machine classifiers trained on respective training data, or naïve Bayes classifiers or correlation techniques. Preferably, previously obtained training data are obtained from the one or more secondary sensors, or from one or more sensor of the same type as said secondary sensor(s) carried by the body, said data having been labelled into different motion and/or position contexts. The labelling is typically manual. For example, previously obtained training data used for determining position context may comprise a plurality of subsets of data obtained from at least one inertial sensor, each subset having been obtained in different position contexts such as "in a pocket", "in the hand", etc. and manually labelled as such. Similarly, previously obtained training data used for determining motion context may comprise a plurality of subsets of data from at least one inertial sensor, each subset having been obtained in different motion contexts such as "walking", "running" etc. and labelled as such.

As a yet further alternative, the motion and position contexts may be determined by application programming interface (API) calls to an operating system (e.g. Google Android®) running on a smartphone or other computing device.

In embodiments, at least one of the position context and motion context is determined during the second time period based on magnitudes of data obtained from the one or more secondary sensors. For example, a second platform may include a three-axis accelerometer and a three-axis gyroscope acting as secondary sensors. At least one of the position context and motion context during the second time period may be determined by reducing the three-axis stream of data to just the overall magnitude of the acceleration or rotation. This advantageously reduces the dimensionality, runtime and processing power required in order to perform the determinations of motion and position context during the second time period and, consequently, reduces the dimensionality, runtime and processing power required to estimate the first metric.

In some embodiments, the first algorithm in step (e) is selected from a set of predetermined algorithms for estimating the at least one first metric, wherein the selection is based on the at least one first metric to be estimated. For example, if the first metric to be estimated is a direction of motion, one algorithm may be used, whereas if the first metric to be estimated is a speed (with no direction of motion), a different algorithm may be selected.

Preferably, in step (e) the third data are arranged as a plurality of frames, each frame comprising a time-ordered plurality of measurement values from the one or more secondary sensors, and wherein the first algorithm is used to provide an estimate of the at least one first metric for each of said frames. For example, for an accelerometer sampled at a rate of 200 times per second, a "frame" of data may represent one second of motion and comprise 200 measurement values. In step (e), the first metric may be estimated for each frame of data that is obtained from the at least one secondary sensor during the second time period.

Thus, in preferred embodiments where the third data are further analysed in order to estimate the evolution of a second metric during the second time period (e.g. a trajectory of the body), the plurality of position estimates obtained from the at least one secondary sensor are constrained by the estimates of the first metric that have been obtained using the first algorithm for each of the frames (or "windows") of second data.

Furthermore, preferably, in step (c) the second data are arranged as a plurality of frames, each frame comprising a time-ordered plurality of measurement values from the at least one secondary sensor, and wherein the temporal length of the frames of second data and frames of third data are substantially the same. In other words, the same frame length of data obtained from the one or more secondary sensors is used to train the first algorithm as is used during the second time period when the trained first algorithm is used to estimate the first metric.

Frame lengths are typically determined by the typical variation timescale (periodic or otherwise) in the secondary sensor data, which is characteristic of the type of motion. For example, in some embodiments, a frame size of the order of 1 second could be used with accelerometer measurements from a walking pedestrian, as the stride rate is around 1 Hz, with a frame of 1 second in length being expected to contain sufficient information to allow reliable estimation of the first metric. Each of the plurality of frames (e.g. of second data and third data) may have the same (e.g. fixed) temporal length, for example 1 second as above.

Where the first algorithm is a neural network, each frame of the second data used to train the neural network, and each frame of the third data during the analysis in step (e), has the same (i.e. "fixed") temporal length. In order to enable greater temporal resolution over a given time period, it is preferable to connect multiple short frames (of the order of 0.1 seconds) in a recurrent neural network. The use of multiple short frames in this manner protects against the body undergoing multiple actual changes of direction of motion during a frame that makes it more difficult to provide an accurate estimation of the first metric during that frame.

In some embodiments, the plurality of frames (e.g. of second data and third data), have a temporal length based on at least one of a determined position context and a determined motion context during the respective first and second time period. For example, based on at least one of the determined position and motion contexts during the second time period, the frame length of the third data may be changed accordingly. For example, when the determined motion context is "running", a more accurate estimation of the first metric (which here would typically be at least one of a direction of motion, speed or velocity), may be obtained by using a shorter frame length than when the determined motion context is "walking", due to the increased frequency of heel strikes in a running motion compared to a walking motion.

A trained neural network may be trained to generate multiple estimates of the first metric over an arbitrary time duration, typically related to the motion context. For example the time duration may be a stride period of a perambulatory motion such as walking or running. These multiple estimates may be obtained by overlapping the frames of third data from which the metrics are estimated. These multiple estimates may then be averaged to give a more reliable estimate over the stride period as a whole, as compared to a single frame having a temporal length spanning the stride period.

At least one frame length of the third data in step (e), and of the second data in step (c), may be determined based on at least one parameter that quantitatively describes an aspect of the determined motion context during the respective period, rather than on an arbitrary or fixed time basis. Preferably said at least one parameter is a repeating parameter. For example, if the determined motion context during the respective period is a perambulatory motion (e.g. walking, running, jogging etc.), data obtained from an accelerometer as a secondary sensor may be used to define a frame of data by heel-strike-to-heel-strike. In other words, the beginning of a frame may be defined by a first heel strike as determined by data from the accelerometer, and the end of the frame may be determined by a subsequent heel strike. Preferably, this is a right heel strike to right heel strike (or left to left) in order that and left/right oscillatory motion is averaged out over a full stride.

The use of frame selection based on at least one parameter that quantitatively describes an aspect of the determined motion context (such as heel strikes) advantageously means that any actual changes in direction of motion of the body within a frame are minimised, thus providing more accurate estimations of the metric of interest during the second time period.

A particular advantage of the present invention when the first algorithm comprises a neural network is that the initial classification of the first training data into particular contexts is not required. However, in some embodiments, the method may further comprise the step of: (a1) determining a training position context of the one or more second platforms with respect to the body during the first time period, and wherein the first training data comprises said training position context(s). Similarly, in some embodiments, the method may further comprise the step of (a2) determining a training motion context of the body during the first time period, and wherein the first training data comprises said determined motion context. Such initial classification of the training data into motion and/or position contexts is particularly beneficial in embodiments where the first algorithm is not a neural network, such as an algorithm based on SVM techniques.

Preferably, where the method includes classification of the first training data into motion and/or position contexts, the method further comprises analysing the third data in order to determine a motion and/or position context during the second time period.

At least one of the training position context and training motion context may be determined by user input. For example, the data obtained during the first time period may be manually labelled with an appropriate training position context and training motion context. In other embodiments, at least one of the training motion context and training position context may be determined by analysis of the first and second data in the same way as described above for the second time period, i.e. through the use of machine learning algorithms or look-up tables.

The determination of the position context and motion context, in either the first or second time periods, may be performed in either order, and may be performed in an iterative manner without loss of generality.

Preferably, the first algorithm comprises (e.g. is) a neural network which is trained using said first training data. However, other algorithms that can be trained using training data may be used, for example algorithms based on Support Vector Regression (SVR) techniques.

In embodiments, the method may further comprise the step of determining the evolution of a training metric related to the motion of the body during the first time period based at least in part on the first data, and wherein the first training data comprises said evolution of the training metric. The training metric is determined at least in part using the first data, i.e. the data from the primary positioning unit. In embodiments, the evolution of the training metric may be determined solely using the first data. The use of the data obtained from the primary positioning unit to determine the first training metric advantageously provides reliable training data with which to train the first algorithm. The first training metric is typically at least one of the following: a position, a speed, a velocity, a direction of motion. Preferably, the training data comprises a trajectory of the body during the first time period—in other words the method comprises determining the evolution of the position of the body during the first time period, e.g. as a plurality of position fixes from the primary positioning unit.

As the primary positioning unit is operational throughout the entirety of the first time period (i.e. at each time instance within the first time period), highly accurate and reliable determinations of the at least one metric of interest may be obtained during the first time period, leading to accurate and reliable training data. For example, if the primary positioning unit comprises a GNSS sensor which has good visibility to the satellite constellation at all times within the first time period, accurate velocity and positioning information may be obtained throughout the first time period and can be used to determine the evolution of the training metric and, in particular, a trajectory of the body during the first time period. Similarly, the primary positioning unit may comprise a visual odometry unit such as a Google Tango® device in order to provide accurate velocity and positioning information during the first time period to determine the evolution of the training metric. Use of such primary positioning units during the first time period advantageously provides training data that may be relied upon.

The evolution of the training metric during the first time period may be determined assuming that the data obtained from the primary positioning unit is accurate and reliable. This may be a reasonable assumption. However, this may not always be the case; for example there may be a duration during the first time period where a GNSS sensor provides corrupted data. Alternatively or in addition the primary positioning unit may have inherent biases, particularly in the case of low-cost devices. If the primary positioning unit is based on visual odometry, although it will able to provide an accurate determination of a metric of interest during the first time period, the use of cameras may be unsuitable in many cases. This may be for privacy reasons or usability—for example the motion and position context during the first time period may be unsuitable for visual odometry.

Thus, in preferred embodiments of the invention, the first training metric may be determined based on the first data and second data obtained during the first time period. In other words, data from at least one secondary sensor may be used in combination with the data obtained from the primary positioning unit in order to determine the evolution of the training metric during the first time period. In further embodiments of the invention, the method may comprise obtaining fourth data during the first time period from at least one further secondary sensor mounted on the first platform carried on the body, and wherein the evolution of the training metric is determined using said first data and at least one of the second data and fourth data. For example, the first platform may be a smartphone that is carried by the user that comprise both a primary positioning unit and one or more secondary sensors. In preferred embodiments, data obtained from the primary positioning unit and at least one further secondary sensor, both mounted on the first platform, are used to determine the evolution of the training metric. In other embodiments, the primary positioning unit is separate to the body (e.g. a CCTV camera system), and the at least one further secondary sensor is mounted to a platform carried on the body.

The step of determining the evolution of the training metric of interest may comprise: obtaining, in a first time sub-period within the first time period, first sub-data from said at least one primary positioning unit; obtaining, in a second time sub-period within the first time period, second sub-data from the one or more secondary sensors and/or at least one further secondary sensor mounted on the first platform; comparing the first sub-data and the second sub-data with each other and/or a motion model of the body during the first time period to obtain corrected first sub-data and/or corrected second sub-data, and; determining the evolution of the training metric related to the motion of the body during the first time period based on (e.g. constrained by) the corrected first sub-data and/or corrected second sub-data. The second sub-data are typically obtained from a secondary sensor mounted on the first platform. In other words the evolution of the training metric may be determined based on data obtained only from the primary positioning unit and at least one secondary sensor mounted on the first platform. However, alternatively or in addition, the second sub-data may be obtained from the at least one secondary sensor mounted on the second platform.

The first time sub-period may be shorter than the first time period, or may be substantially the same length as the first time period. Similarly, the second time sub-period may be shorter than the first time period, or may be substantially the same length at the first time period.

Each of the first and second time sub-periods may be substantially the same length as the first time period, in which case the step of comparing the first sub-data and the second sub-data with each other and/or a motion model of the body during the first time period to obtain corrected first sub-data and/or corrected second sub-data may be seen as obtaining corrected first data and/or second data. However, typically, the first and second time sub-periods are different, and may be used to provide a "moving window" of a series of metrics (e.g. user positions or velocities) at a corresponding series of time instances within the first time period based on the perceived reliability of the data in the first and second time sub-periods corresponding to a particular time instance.

The motion model typically comprises at least one of: a speed, a direction of motion, a velocity, a position context of the one or more second platforms with respect to the body during the first time period, and a motion context of the body during the first time period, preferably wherein the motion model is at least partially determined from an analysis of the first sub-data and/or second sub-data. The motion model may be provided using the trained first algorithm.

The position and motion contexts may have been determined in the manner described above, e.g. through analysis of the sub-data, or by user input. In some embodiments, the motion model comprises at least one parameter that quantitatively describes an aspect of the motion, and/or at least one function that may be used to determine a parameter that quantitatively describes an aspect of the motion. For example, the at least one parameter may be one of: a pedestrian step length, a pedestrian speed, a pedestrian height, a pedestrian leg length, a stair rise, a stair run, or a compass-heading to direction-of-motion offset.

The use of the corrected first sub-data and/or corrected second data beneficially allows an improved accuracy determination of the evolution of the training metric (and therefore first training data) to be generated, as will be further explained herein. By cross-comparing the first sub-data and second sub-data (particularly if obtained from different sensors and/or time sub-periods) with each other and/or the motion model, errors or inaccuracies in the originally obtained first sub-data and/or second sub-data may be corrected before determining the evolution of the training metric during the first time period. This finds particular benefit when the one or more secondary sensors and/or primary positioning unit are low-cost sensors (for example as seen in smart phones) which are typically of low quality and have large inherent biases.

A particular advantage of this aspect of the invention is that the first training data can be continually updated during substantially any time period during which the primary positioning unit is operational. For example, first training data may be obtained during a first time period when a user carrying the first platform (such as a smartphone) is outside (where a GNSS sensor acting as the primary positioning unit has visibility to the satellite constellation). During a second, subsequent, time period, when the user moves indoors and the GNSS data are unavailable, data obtained from at least one secondary sensor mounted on a second platform carried by the user (such as a fitness tracker) may be used to estimate the desired first metric using the first algorithm trained using data obtained during the first time period. Once the user moves outside again and the primary positioning unit becomes operational, suitable training data may again be obtained.

The comparing of the data obtained during the first and second time sub-periods with each other and/or a motion model of the body provides further advantages over state-of-the-art methods which do not perform such analyses before processing the obtained data to provide a tracking solution. The present invention thus allows data which are more reliable and/or accurate to be used in first training data for training the first algorithm.

The comparing the first sub-data and second sub-data with each other and/or the motion model may include performing self-consistency checks. These may for example comprise analysing the data from a given sensor across its corresponding time sub-period. Typically this may include analysing the data to ensure that it does not violate the accepted laws of Physics for the motion model. For example, the first sub-data may be obtained from a GNSS sensor and show a positioning trace that is smooth with distances of 1 m between positions at 1 s update intervals which is consistent with the determined training motion context (e.g. walking), then suddenly shows a single value 1 km away before returning near the original sequence of positions. From this we can infer that the "1 km" data point is not consistent with the remainder of the data, and can therefore be ignored in determining the first training metric. Other examples of data that would not pass such a self-consistency analysis include magnetometer values outside those that are valid for the local geomagnetic field, and spikes in otherwise smooth or unchanging barometer data that do not coincide with spikes in acceleration data that would suggest an actual altitude variation.

The first sub-data and second sub-data are compared with each other and/or a motion model of the body during the first time period. For example, this analysis may comprise determining at least one data point of the data from the first sub-data and/or second sub-data that does not correspond to determined training position and/or motion contexts during the first time period, and correcting for said at least one data point. Suppose that the training motion context is that for a running user ("running"), and that on an analysis of the first data, a spurious data point is highlighted that does not correspond to such a motion—for example a data point that would suggest the platform moved a distance in a time frame that would be inconsistent with someone who was running—such an erroneous data point can be corrected for (e.g. removed) in order to determine the evolution of the training metric with improved accuracy. Such an analysis aids in avoiding spurious results that are a common problem in GNSS systems for example.

The comparing of the first and second sub-data with each other and/or the motion model may comprise determining a measurement bias of at least one secondary sensor and/or the at least one primary positioning unit and correcting for said bias in order to obtain the corrected sub-data. This is particularly advantageous when low-cost sensors are used that are prone to such biases (e.g. MEMs sensors). Suppose that the motion model during the first time period is determined as "running", in which it is known that the velocity of each of the user's feet is zero at regular intervals when it is on the ground. If the secondary sensor comprises an inertial sensor mounted on the second platform located on a user's foot, a zero velocity update analysis can be used to determine a bias of the inertial sensor during each stationary period. This bias measurement can be used to constrain the evolution of the training metric during the first time period by taking the determined sensor bias into account, so as to improve the accuracy of the evolution of the training metric, and therefore improve the accuracy of the first training data. Furthermore, biases in the at least one secondary sensor that are determined in the analysis during the first time period may be taken into account when estimating the metric of interest in the second time period.

Advantageously, the durations and/or amount of overlap of the first and second time sub-periods may be chosen based on an analysis of the reliability and/or accuracy of the data obtained from the one or more secondary sensors and at least one primary positioning unit during the first time period. In general, the durations of the first and second time sub-periods are determined based on at least one of the sampling frequency of the respective sensor, the required statistical confidence of the obtained data, and the amount of data required to identify any erroneous results. For example, in order to determine whether a platform is static or not, a time period is required in which to obtain the data necessary to make such a determination. A hundred measurements may be required in order to get a clear measure of the standard deviation of the statistics of the obtained data, therefore requiring a time duration of $100/f_s$, where $f_s$ is the sampling frequency of the respective sensor. As a further example, if the data is obtained from a GNSS sensor acting as the primary positioning unit and we wish to identify and remove spurious data points (such as a GNSS data point that moves 1 km in 1 s and then back again), a rolling window of 5-10 data points may only be required. This assumes a relatively smooth motion of the platform of interest.

Suppose that a GNSS sensor (acting as the primary positioning unit), providing a time-series of measurements of position, experiences interference for a short period during the first time period during which the data are identified as corrupted. Conventionally, the trace of position would similarly be corrupted as the data would be analysed point by point in time order without reference to future data points. Advantageously, in the present invention, the analysis of the data obtained during the first time period allows the corrupted data to be ignored and only data obtained before and after the corrupted time period to be used to interpolate a trace during the corrupted period. Alternatively, after identifying the corrupted data, the time sub-periods may be dynamically adjusted so as to remove the corrupted time period, with the evolution of the training metric being interpolated during the corrupted time.

In general, the obtained first and second sub-data are assessed on timescales that are appropriate to the sensor being used or the training metric of interest being determined. In some embodiments, the parameters (e.g. length and relative overlap) of the first and second time sub-periods are chosen so as to allow for the identification and correction of at least one error in the first and/or second sub-data.

In embodiments, at least one of the first and second sub-data are analysed backwards in time, preferably iteratively analysed forwards and backwards in time. This takes advantage of the fact that the first training data do not need to be generated in real-time. Improved accuracy determination of the evolution of the training metric during the first time period may be advantageously achieved by such analysing at least one of the first and second sub-data backwards in time. For example, if the same spurious data point is identified on an analysis of the data forwards and backwards in time, then that data point may be ignored or corrected on future passes through the data set.

Analysing the sub-data backwards in time also advantageously allows asymmetries in the obtained sub-data to be used in order to assess and/or correct for the reliability and/or accuracy of the sub-data. For example, an error "event" in the obtained data from a sensor (either the secondary sensor or primary positioning unit) may show up as a gradual change when analysed in the forwards direction (and therefore would not necessarily appear to be erroneous), but may show up as an implausible discontinuous jump when analysed in the backwards direction. Therefore, by analysing the data backwards in time, the obtained data may be corrected accordingly (for example by removing the data points making up the event). In preferred embodiments, the analysis of the first and/or second sub-data backwards in time allows for erroneous data to be removed from subsequent passes of the data and determinations of the first training metric, providing a significant improvement over a simple averaging of the forwards and backwards data.

In particularly beneficial embodiments, the first and/or second sub-data are iteratively analysed forwards and/or backwards in time. Preferably, a first analysis of these sub-data is based on at least one confidence threshold and the at least one confidence threshold is modified after the first analysis; wherein a subsequent analysis of the first and/or second sub-data is based on the modified confidence threshold. In other words, for such iterative analysis, at least two passes (analyses) are made through these data, and confidence threshold(s) may be modified after each pass. The modification may be based on the results of the first analysis. For example, on a first pass the sub-data may be analysed with a first confidence threshold that may not filter out any data. On subsequent passes of the sub-data, some data may be excluded (or assigned greater uncertainty) when a tighter confidence threshold is used. Confidence thresholds that are changed on subsequent passes through the first and/or second sub-data advantageously allow the gradual removal of erroneous measurements that only become evident as erroneous through multiple passes through the data.

Confidence thresholds may be set initially ("predetermined") according to the known statistical noise properties of the at least one secondary sensor or primary positioning unit, or from information derived from other sensors, where information from a first sensor may be used to determine threshold(s) appropriate for testing the validity of measurements from a second sensor. For example, an inertial secondary sensor providing acceleration information may be used to set thresholds on the expected variation in GNSS frequency measurements obtained from the primary positioning unit during dynamic motions. Here, changes in position may be deduced from measurements of acceleration, from which limits in the acceptable changes in position deduced from a GNSS or other position sensor may be set.

On a subsequent pass through the data, confidence in the information from other sensors may be improved; for example the biases associated with an inertial sensor may be known more accurately, leading to improved estimates of acceleration and hence tighter bounds on any GNSS frequency variations obtained from the primary positioning unit. A glitch or error in frequency measurement that was allowed during the first pass might now be removed on the second pass. Iterative analysis of the sub-data also advantageously allows any biases in the at least one secondary sensor and/or primary positioning unit to be determined more reliably.

In embodiments, the evolution of the first training metric during the first time period is determined in near-real-time (for example within 1 second of real-time). However, in particularly advantageous embodiments, the at least one first training metric during the first time period is determined in a batch process subsequent to the first time period. The batch process may comprise a least-squares or other estimator applied to the data obtained during the first time period, and advantageously provides the most accurate and reliable first training data during the first time period.

The inventors have realised that in many cases, the data that are obtained during the first time period may provide redundant information with respect to training the first algorithm, thus leading to an unnecessarily inefficient use of computer resources and processing power during the training phase. For example, if the body during the first time period is a user with a jogging motion context, a large proportion of the frames of data will be similar to each other due to the repetitive nature of the jogging motion.

Therefore, preferably, the method of the present invention may further comprise the steps of: (f) during a third time period, obtaining fifth data related to the motion of the body from the at least one primary positioning unit; (g) during the third time period, obtaining sixth data from the one ore more secondary sensors; (h) determining the evolution of a training metric related to the motion of the body during the third time period, based at least in part on the fifth data; (i) analysing the sixth data to estimate the evolution of the training metric during the third time period, wherein the estimated evolution of the training metric is constrained by at least one first metric estimated using the first algorithm trained using the first training data; (i) comparing the determined and estimated evolutions of the training metric, and; if the difference between the determined and estimated evolutions of the training metric is greater than a predetermined threshold, updating the first training data with second training data, wherein the second training data comprises the fifth data and sixth data. The difference being greater than a predetermined threshold implies that the second training data includes information not yet present in the first algorithm, and training of the first algorithm should proceed using said second training data.

On the other hand, if the difference between the determined second training metric and the estimated second training metric is less than the predetermined threshold, then this implies that the second training data would not further improve the first algorithm, and hence the second training data may be ignored.

Such a comparison with the second training data may be performed at regular intervals.

As has been described above, a particular advantage of the present invention is that the first metric obtained using the first algorithm may be used to constrain the estimation of an evolution of a second metric related to the motion of the body during the second time period. In preferred embodiments, this is an evolution of the body's position over time (i.e. the body's trajectory) during the second time period. In other words, the trained first algorithm is able to provide quantitative estimates of some aspects of the body's motion during the second time period (i.e. the first metric or first metrics)—such as speed and direction of motion—which can be used to constrain the estimation of the second metric (e.g. a trajectory) based on data obtained from the one or more secondary sensors mounted on the one or more second platforms (e.g. an inertial navigation system) during the second time period.

The evolution of the second metric during the second time period may be seen as being constrained by a motion model of the body during the second time period, wherein the motion model comprises the first metric (or a plurality of first metrics) obtained by the first algorithm. In other words, the at least one first metric estimated using the trained first algorithm may be seen as a motion model of the body during the second time period.

The estimation of the evolution of the second metric may comprise obtaining, in a third time sub-period within the second time period, third sub-data from a first secondary sensor mounted on the second platform; obtaining, in a fourth time sub-period within the second time period, fourth sub-data from said first secondary sensor and/or a further secondary sensor mounted on the or another second platform carried on the body; comparing the third sub-data and the fourth sub-data with each other and/or the estimated first metric (e.g. motion model) to obtain corrected third sub-data and/or corrected fourth sub-data, and; estimating the evolution of the second metric during the second time period based on (e.g. constrained by) the corrected third sub-data and/or corrected fourth sub-data.

The third time sub-period may be shorter than the second time period, or may be substantially the same length as the second time period. Similarly, the fourth time sub-period may be shorter than the second time period, or may be substantially the same length at the second time period. Typically, the third and fourth time sub-periods are different. The durations and/or amount of overlap of the third and fourth time sub-periods may be chosen based on an analysis of the reliability and/or accuracy of the data obtained from the one or more secondary sensors during the first time period.

The same techniques as outlined above in relation to estimating the evolution of the first training metric may be used when estimating the evolution of the second metric. Hence, the use of such time sub-periods and the comparison of the third and fourth sub-data with each other and/or the estimated first metric (e.g. "motion model") has the same advantages as outlined above in relation to determination of the evolution of the first training metric.

Preferably, the comparing the first sub-data and/or second sub-data with the first metric comprises performing self-consistency checks.

Preferably, at least one of the third sub-data and fourth sub-data are analysed backwards in time, preferably iteratively analysed forwards and backwards in time, in order to obtain the corrected third sub-data and/or corrected fourth sub-data.

Preferably, the comparing the third sub-data and fourth sub-data with each other and/or the estimated first metric comprises determining a measurement bias of at least one secondary sensor, and correcting for said bias in order to obtain the corrected sub-data.

The evolution of the second metric may be estimated in near-real-time (for example within 1 second of real-time). However, in particularly advantageous embodiments, the evolution of the second metric may be estimated in a batch process subsequent to the second time period. The batch process may comprise a least-squares or other estimator applied to the data obtained during the first time period, and advantageously provides the most accurate and reliable estimation of the second metric during the second time period.

In accordance with a second aspect of the invention there is provided a computer readable medium comprising executable instructions that when executed by a computer cause the computer to perform the method of the first aspect of the invention.

The computer readable medium may be provided at a download server. Thus, the executable instructions may be acquired by the computer by way of a software upgrade.

In accordance with a third aspect of the invention there is provided a tracking system for tracking the motion of a body, as a function of time, the system comprising: at least one primary positioning unit; one or more secondary sensors configured to make measurements from which position or movement may be determined, mounted on one or more second platforms able to be carried on a body, and; a processor adapted to perform the steps of: (a) during a first time period when the at least one primary positioning unit is operational, obtaining first data from said at least one primary positioning unit; (b) during the first time period, obtaining second data from the one or more secondary sensors, said one or more second platforms being carried on the body during the first time period; (c) generating first training data comprising the first and second data; (d) during a second time period during which the one or more second platforms are carried on the body, obtaining third data from the one or more secondary sensor, and; (e) analysing the third data to estimate at least one first metric related to the motion of the body during the second time period using a first algorithm trained using the first training data.

The at least one primary positioning unit may be mounted on a first platform that is able to be carried on a body, said first platform being carried on the body during the first time period. Alternatively or in addition, the at least one primary positioning unit may be separate to the body. Typically, the tracking system further comprises at least one further secondary sensor mounted on the first platform.

Preferably, the processor is further adapted to perform the step of analysing the third data to estimate the evolution of at least one second metric related to the motion of the body during the second time period, wherein the evolution of the at least one second metric is constrained by the at least one first metric estimated using the first algorithm. In general, the processor of the third aspect of the invention may be adapted to perform the method as set out in the first aspect of the invention. Thus the third aspect of the invention provides the same advantages as have been outlined above.

In the present invention, the one or more secondary sensors may comprise at least one of: an accelerometer, a gyroscope, a magnetometer, a barometer, a pedometer, a light sensor, a pressure sensor, a strain sensor, a proximity sensor, a camera and any other sensor capable of providing measurements related to position, as may occur to one skilled in the art. Typically the one or more secondary sensors are part of an inertial navigation system.

In any of the first, second or third aspects of the invention, the at least one primary positioning unit may comprise at least one of: a GNSS unit, camera, a RADAR, a LIDAR, and any other positioning system as may occur to one skilled in the art. Where the primary positioning unit comprises a camera carried by the body which is tracked, this is typically a part of a visual odometry unit.

The present invention may be implemented on a range of devices. The first platform may be any device on which a primary positioning unit is mounted. The first platform is typically a smartphone carried by the user, or could be a tablet, laptop computer etc. The second platform is typically a wearable device such as a smart watch, fitness tracker or headset worn by a user. One or more first platforms may advantageously be used to provide training data for one or more second platforms. For example, a single first platform may be used to provide training data for a plurality of second platforms carried by a user, and a plurality of first platforms may be used to provide training data for a single second platform.

It is particularly advantageous to use data from sensors mounted on two or more independent platforms during either the first or second time periods such that data from the two or more platforms may be cross referenced. For example, during the second time period it is desirable to estimate the trajectory of the body using secondary sensors mounted on a headset and a fitness tracker (for example) in order to avoid re-use of information in the trajectory solution (known as "data incest").

As has been outlined above, the first metric obtained using the first algorithm is typically at least one of a direction of motion, a speed, a velocity, a position context and a motion context; and the evolution of the second metric of interest is typically a tracking solution such as a trajectory. In general, examples of metrics that may be estimated using the present invention include a position, a range, a speed, a velocity, a trajectory, an altitude, a compass heading, a stepping cadence, a step length, a distance travelled, a motion context, a position context, an output power, a calorie count, a sensor bias, a sensor scale factor, and a sensor alignment error.

The present invention is particularly suited to scenarios where a GNSS sensor is not operational during the second time period, and the evolution of a metric of interest is to be tracked using data from secondary sensors only. However, it will be appreciated the invention may also be used in scenarios where the GNSS sensor is operational, with the first metrics estimated by the trained machine learning algorithm being used to further constrain and improve the accuracy of the tracking solution.

Further disclosed herein is a computer-implemented method performed in a tracking system for tracking the motion of a body, as a function of time, the method comprising:
(a) during a first time period, obtaining first data from at least one secondary sensor configured to make measurements from which position or movement may be determined and at least one primary positioning unit that is operational during the first time period, wherein the at least one secondary sensor and the at least one primary positioning unit are carried on a body; (b) generating first training data comprising the first data; (c) during a second time period, obtaining second data from at least one secondary sensor carried by a body, and; (d) analysing the second data to estimate a metric related to the motion of the body during the second time period using a first algorithm trained using the first training data. The at least one secondary sensor and at least one primary positioning unit may be mounted on a common platform carried by the body.

Further disclosed herein is a computer-implemented method performed in a tracking system for tracking the motion of a body, as a function of time, the method comprising: (a) during a first time period, obtaining first data from at least one primary positioning unit mounted on a first platform carried on a body, said primary positioning unit being operational during the first time period; (b) during the first time period, obtaining second data from at least one secondary sensor configured to make measurements from which position or movement may be determined, said at least one secondary sensor being mounted on a second platform carried on the body; (c) generating first training data comprising the first data and second data; (d) during a second time period, obtaining third data from at least one secondary sensor carried by the body, and; (e) analysing the third data to estimate a metric related to the motion of the body during the second time period using a first algorithm trained using the first training data.

Further disclosed herein is a tracking system for tracking the motion of a body, as a function of time, the system comprising: at least one secondary sensor configured to make measurements from which position or movement may be determined and at least one primary positioning unit, said at least secondary sensor and primary positioning unit able to be carried by a body, and; a processor adapted to perform the steps of: (a) during a first time period when the at least one secondary sensor and at least one primary positioning unit are carried by a body, obtaining first data from the at least one secondary sensor and the at least one primary positioning unit, said primary positioning unit being operational during said first time period; (b) generating first training data comprising the first data; (c) during a second time period, obtaining second data from at least one secondary sensor carried by a body; (d) analysing the second data to estimate a metric related to the motion of the body during the second time period using a first algorithm trained using the first training data.

BRIEF DESCRIPTION OF THE DRAWINGS

Exemplary embodiments of the invention will now be described with reference to the figures, in which.

DETAILED DESCRIPTION OF THE DRAWINGS

Figure 1:
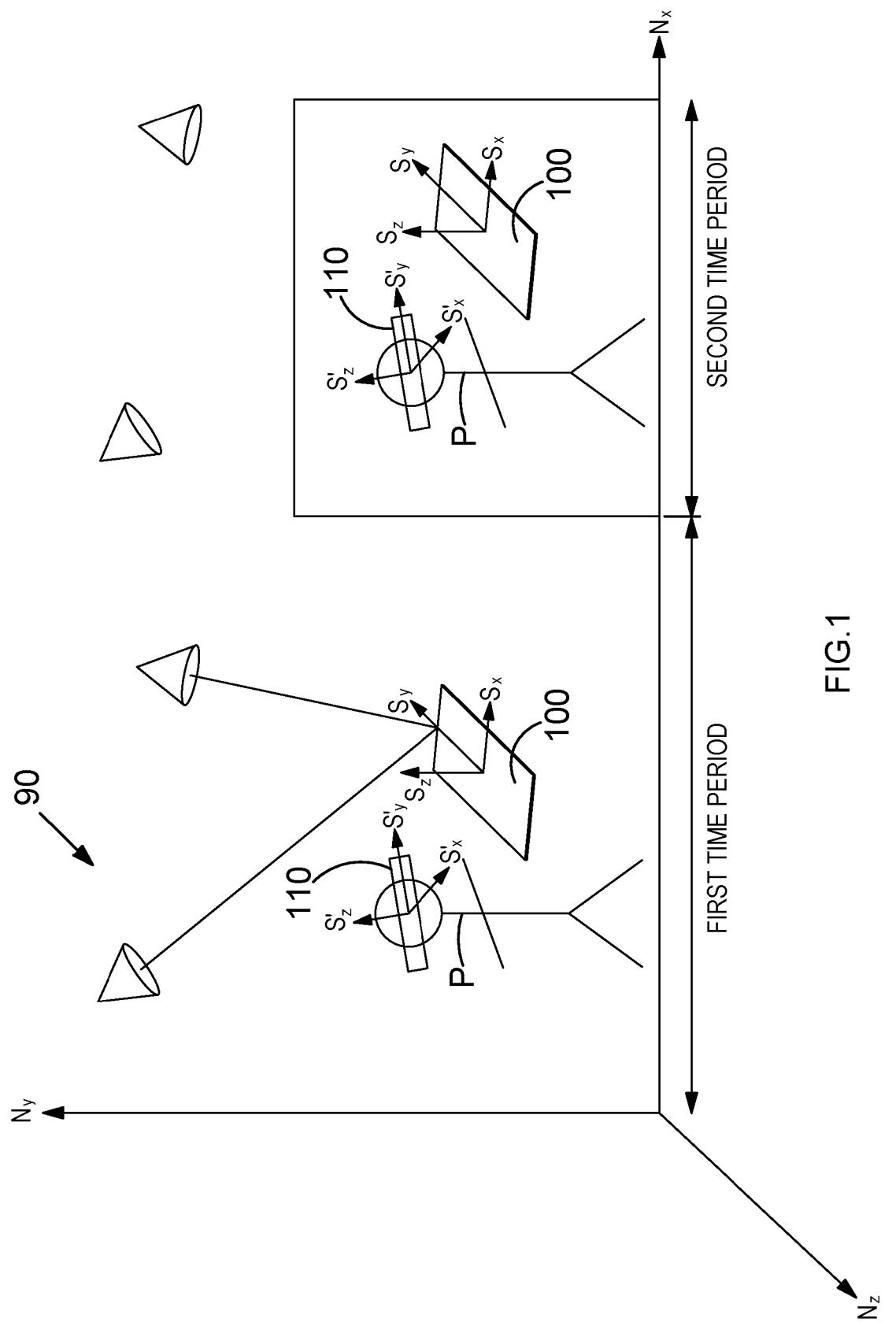
FIG. 1 is a schematic diagram illustrating an example implementation of the present invention.

FIG. 1 schematically illustrates how the present invention may be implemented in order to provide an estimate of a metric of interest related to the motion of a body.

As schematically illustrated in FIG. 1, in this embodiment, a pedestrian P is wearing a headset 110, mounted on the head, and carries a smartphone 100. In this embodiment, the smartphone 100 is the first platform and the headset 110 is the second platform. The smartphone 100 and headset 110 are separate. It is also to be noted that in this example, the pedestrian P, the smartphone 100 and headset 110 are not in a particular fixed relationship, such as in a strapdown or gimballed setup. In other embodiments the pedestrian P may carry further second platforms and/or first platforms.

The smartphone 100 (which will be described in more detail below with reference to FIG. 2a) comprises a primary positioning unit in the form of a GNSS sensor 20, and a suite 10 of secondary sensors. As schematically shown in FIG. 1, during the first time period, the GNSS sensor 20 has a clear line of sight to the satellite constellation 90, and is therefore operational in order to provide positioning and timing data. However, the pedestrian P subsequently moves indoors, where the GNSS sensor 20 no longer has a clear line of sight to the satellite constellation 90 and thus is no longer capable of providing positioning and timing data. This time period where the GNSS sensor is not operational is the second time period. The present invention allows for an accurate estimation of the trajectory of the pedestrian during the course of the second time period during which the GNSS sensor is not operational.

During the second time period, the GNSS sensor 20 is not operational (meaning that it is not capable of receiving signals from the satellite constellation 90), and therefore the trajectory of the pedestrian P is required to be estimated using only data from the secondary sensor suite 10' on the headset 110. Conventionally, a trajectory solution may be provided by performing, at each time instance in the second time period, single integration of the data from the rate gyroscope 14' to determine device attitude and double integration (while correcting for gravity) of the data obtained from the accelerometer sensor 12' in order to obtain position data. However, as has been discussed above and as is well known in the art, such integration-based solutions based on consumer-grade inertial sensors are typically subject to large accumulated attitude and position errors after only a matter of seconds due to the numerical integration of measurements from noisy and often poorly calibrated sensors. This is exacerbated in situations, as here, where the device is not in a strapdown or gimballed relationship with the body. The present invention overcomes these issues, as will be explained below.

FIG. 1 also schematically illustrates the navigation frame of reference, N, and the sensor frames of reference, S and S'. The navigation frame of reference is defined by an orthogonal coordinate system Nx, Ny, Nz, and is typically the Earth frame of reference, i.e. East-West; North-South; Up-Down. The sensor frame of reference for the first platform, S, is an orthogonal coordinate system Sx, Sy, Sz centred on the centre of mass of the smartphone 100 (i.e. the platform to which the sensors are mounted). The sensor frame of reference for the second platform, S', is an orthogonal coordinate system S'x, S'y, S'z centred on the centre of mass of the headset 110. The trajectory of the pedestrian P during the second time period is to be determined in the navigation frame of reference, N.

Figure 2A:
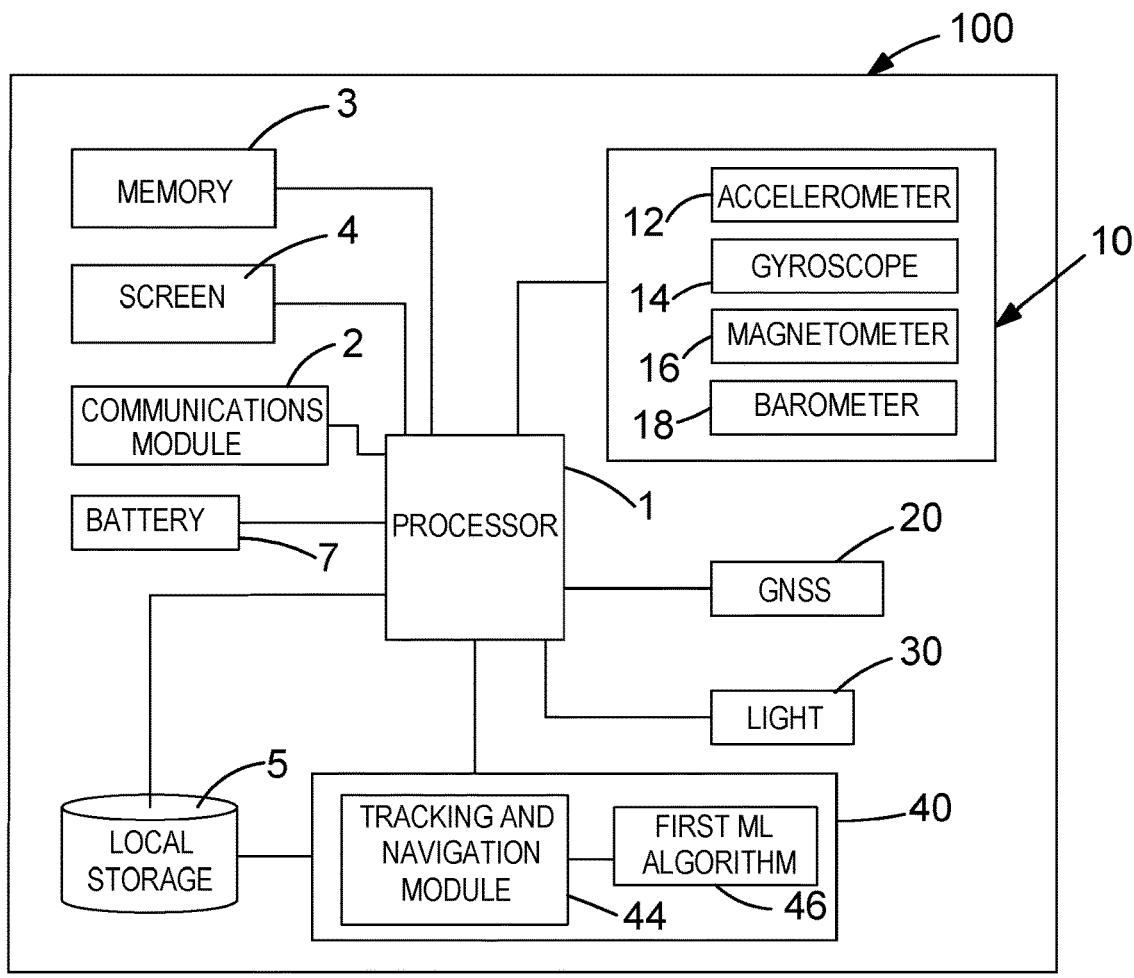
FIG. 2a is a schematic logical diagram of a first portable device that may implement the invention.

FIG. 2a shows the relevant components of the smartphone 100, which includes a processor 1, communications module 2, memory 3, screen 4, local storage 5 (non-volatile memory) and a battery 7. The communications module 2 comprises components necessary for wireless communication, such as a receiver, transmitter, antenna, local oscillator and signal processor.

The smartphone 100 also comprises a suite 10 of secondary sensors, which here includes an accelerometer 12, a gyroscope 14, a magnetometer 16 and a barometer 18. The accelerometer is configured to measure the acceleration of the smartphone; the gyroscope is configured to measure the rotation rate of the smartphone, the magnetometer is configured to measure the strength and direction of the local magnetic field, and hence the compass heading of the smartphone 100, and the barometer is configured to measure atmospheric pressure and infer an altitude of the smartphone. The accelerometer, gyroscope, magnetometer and barometer may be MEMs devices, which are typically tri-axial devices, where each orthogonal axis comprises a separate sensor. Other secondary sensors may be included in such a sensor suite 10. The suite of secondary sensors will be referred to as an inertial measurement unit (IMU) 10. The smartphone 100 also comprises a light sensor 30.

The smartphone 100 further comprises a GNSS sensor 20, such as a GPS, Galileo, or GLONASS sensor (in any combination) acting as the primary positioning unit. In other embodiments, other primary positioning units may be used instead of or in combination with the GNSS sensor, examples of which have been discussed above in the summary of the invention section.

Each of the communications module 2, memory 3, screen 4, local storage 5, battery 7, sensor suite 10, light sensor 30 and GNSS sensor 20 is in logical communication with the processor 1. The processor 1 is also in logical communication with Tracking Solution Unit (TSU) 40, which is operable to obtain data from GNSS unit 20 and the secondary sensors, and determine a tracking solution for the motion of the pedestrian. The TSU 40 comprises a tracking and navigation module 44 and machine learning algorithm (in this case a neural network) schematically shown at 46. The TSU 40 may be implemented in hardware, firmware, software, or a combination thereof.

Figure 2B:
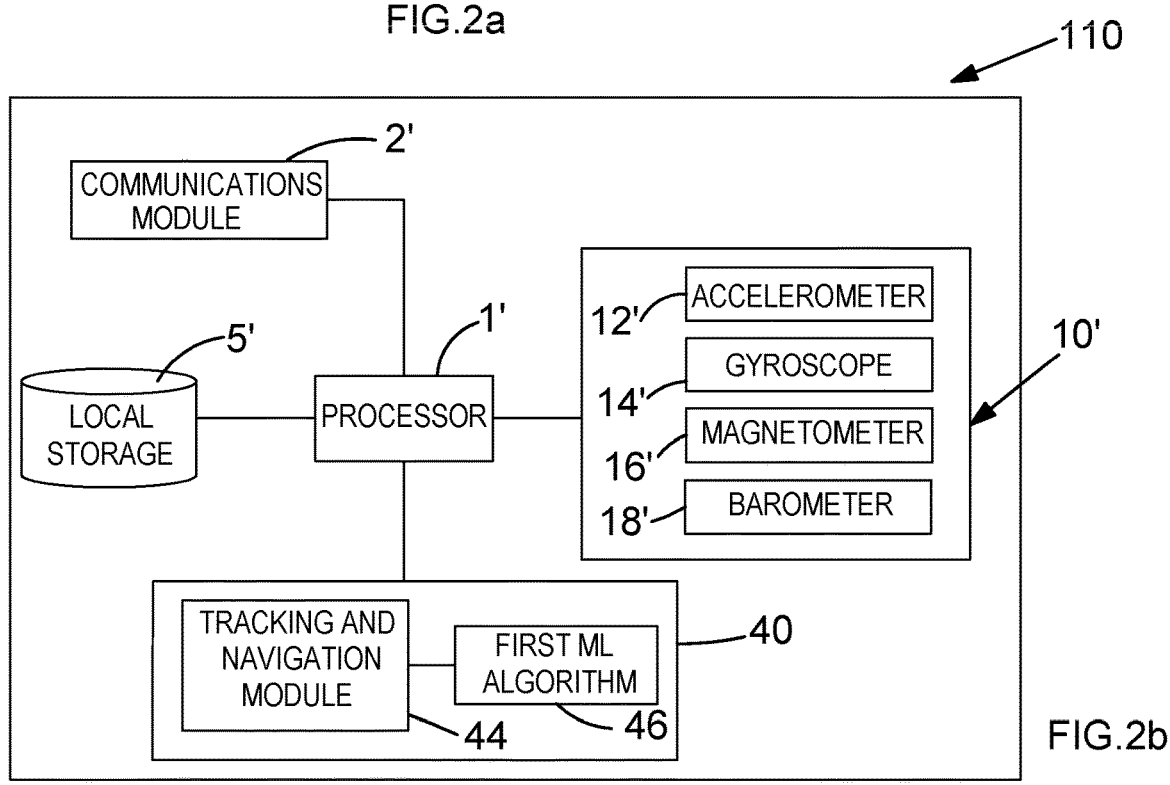
FIG. 2b is a schematic logical diagram of a second portable device that may implement the invention.

As illustrated in FIG. 2b, the headset 110 comprises a suite (IMU) 10' of secondary sensors, in this case an accelerometer 12', gyroscope 14', magnetometer 16' and barometer 18'. The headset also comprises a local storage 5', communications module 2' and a TSU 40 in the same manner as described in relation to the smartphone 100. The headset 110 does not comprise a GNSS sensor or other primary positioning unit.

In FIG. 2b, the headset 110 is illustrated as having its own TSU 40 thereon, with the tracking solution during the second time period being provided by its TSU. The headset 110 and the smartphone 100 are in wireless communication, for example via the internet or local network, or by other wireless protocols such as Bluetooth, such that data may be transferred between the smartphone and headset. In other embodiments, the headset may not comprise a TSU, with the data obtained by the sensors on the headset 110 during the second time period transferred to the smartphone 100, or other device, for remote analysis and provision of the tracking solution.

Data obtained by the smartphone 100 when the GNSS sensor 20 is operational may be used to train the machine learning algorithm 46 such that in a second time period when the GNSS sensor is not available, a tracking solution for the pedestrian P may be estimated using data obtained only from the secondary sensors mounted on the headset.

As will be described below, training of the neural network is typically performed externally to the local devices 100, 110. In FIGS. 2a and 2b, the neural network schematically represented at 46 is the most up-to-date version of the neural network that has been downloaded to the smart phone 100 and headset 110, and thus may be used during the second time period when the GNSS sensor is not available.

Figure 3:
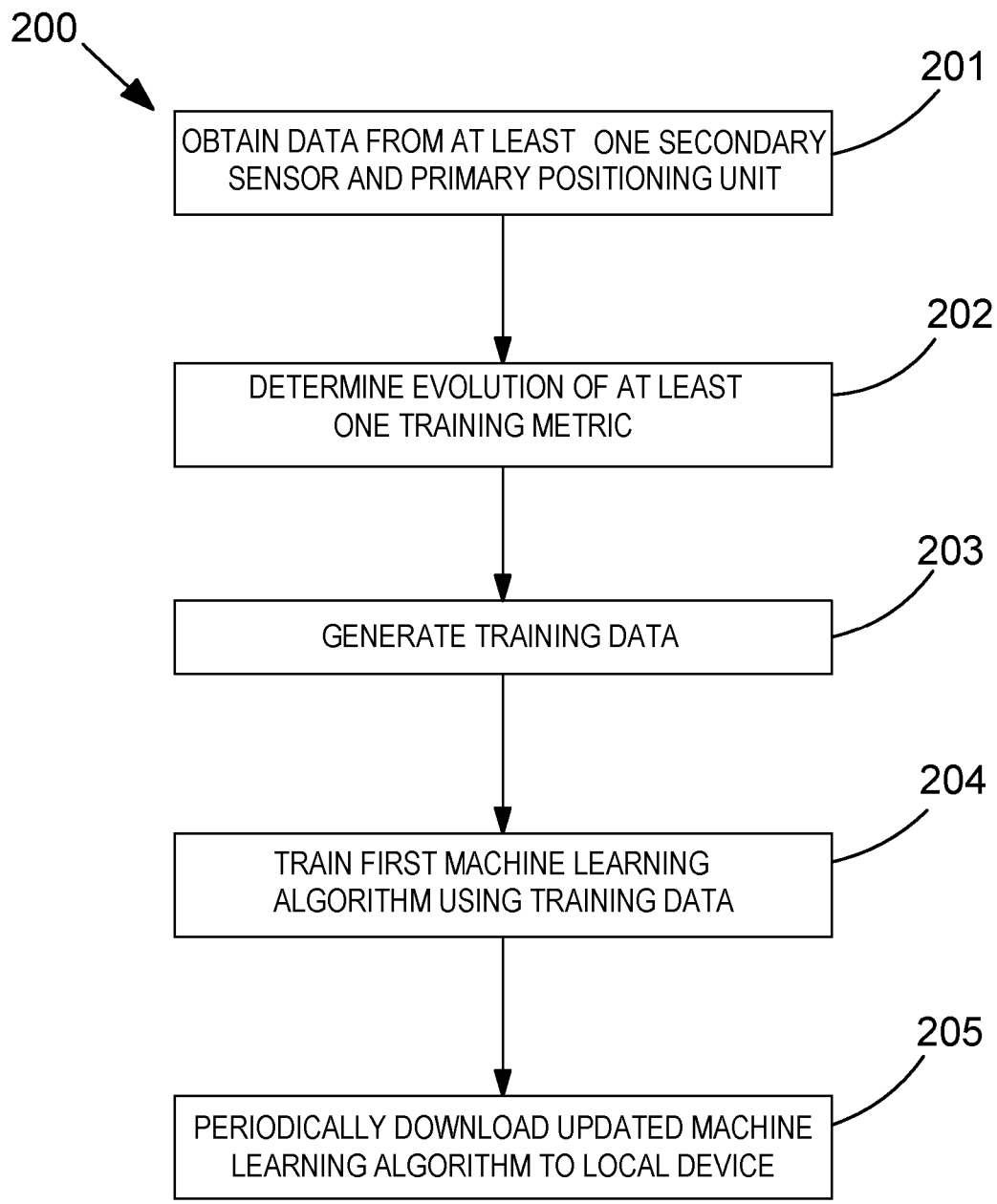
FIG. 3 is a flow diagram outlining a preferred series of method steps that may be performed during the first time period.

FIG. 3 is a flow diagram outlining the steps of a preferred embodiment of the method 200 performed during the first time period, during which time the GNSS sensor 20 on the smartphone 100 is operational. This may be referred to as the training phase. At step 201, first data is obtained from the GNSS sensor 20 mounted on the smartphone, and second data is obtained from the secondary sensors 12', 14', 16', 18' mounted on the headset.

Data is also obtained from the secondary sensors 12, 14, 16 and 18 of the IMU 10 of the smartphone. These first data and second data are obtained for a plurality of motion and position contexts. For example, during the first time period in which the GNSS sensor 20 is operational, the pedestrian P may change motion context from walking to running and back to walking again, or may intermittently turn their head to one side while in motion so changing the orientation of the headset with respect to the direction of motion. Similarly, the position context of the smartphone may change a number of times, perhaps from being held in the pedestrian's hand, to being placed in a trouser side pocket and subsequently held to the ear during a phone call.

During the training phase in the first time period, these data obtained by the sensors on the smart phone 100 and headset 110 are typically transmitted, via respective communications modules 2, 2', to an external database (e.g. hosted by the cloud) for further processing by an external processor, as described below. This advantageously reduces the storage space and processing power required by the local devices 100, 110. However, it is envisaged that in alternative embodiments the steps of FIG. 3 (described below) may be performed locally on the smartphone and headset.

At step 202, the evolution of at least one training metric is determined based on the first data. The evolution of the training metric is determined at least in part—and typically entirely—by the data obtained from the GNSS sensor. The training metric may be, for example, a series of position fixes for the smartphone 100 obtained by the GNSS sensor 20 during the first time period, with the evolution of these position fixes over time giving a trajectory of the smartphone (which gives a good approximation of the trajectory of the pedestrian). Here, it is assumed that the data obtained directly from the GNSS sensor is accurate and reliable across the first time period, and is therefore used for the determination of the pedestrian's trajectory during the first time period.

However, in other embodiments, further analysis of the first data obtained during the first time period may be performed in order to obtain a more accurate determination of the pedestrian's trajectory during the first time period. For example, the determination of the pedestrian's trajectory during the first time period may be determined based on an analysis of the data obtained from the IMU 10 of the smartphone as well as the GNSS sensor. Such techniques will be described in further detail herein.

At step 203, training data are generated using the first data, second data and the determined trajectory. Thus, the training data comprises data obtained from the secondary sensors 12', 14', 16', 18' mounted on the headset which are associated with the determined trajectory of the pedestrian during the first time period, obtained across a variety of motion contexts and position contexts.

The position fixes obtained by the GNSS sensor during the first time period are obtained in the navigation frame N, and hence the determined trajectory is also in the navigation frame N. However, it is desirable to transform these data into the headset sensor frame S' for use as the training data. Hence, the yaw offset between the sensor frame S' and the navigation frame N must be accurately known or determined during the first time period. Data from the accelerometer 12', gyroscope 14' and magnetometer 16' on the headset may be used to track the yaw offset between the headset sensor frame S' and the navigation frame N, and hence accurately transform the direction of motion obtained from the GNSS sensor 20 from the navigation frame N into the sensor frame S' for use in the training data.

In step 204, these training data are then used to train the neural network. During the first time period, the pedestrian P may walk along a direction aligned with the Nx axis (see FIG. 1). During the walking motion, there will typically be motions along the Ny axis (e.g. a vertical "bounce" of the pedestrian) and Nz axis (e.g. a side to side motion of the pedestrian), as well as the movement along Nx. These motions will be represented by data obtained by the secondary sensors on the headset 110 such as the accelerometer 12' and gyroscope 14', and present in the training data. Through training using the training data, the NN learns about these three orthogonal patterns that exist for a walking motion context, regardless of the sensor orientation. Similarly, if the pedestrian P breaks out into a run, at least the vertical "bounce" along the Ny axis will typically be more pronounced than for walking, and hence the NN may learn about the signature orthogonal patterns in the accelerometer data that exist for a running context, again independent of the sensor orientation. Furthermore, if provided with sufficient training data spanning a range of walking and running speeds, the NN may learn about the relationships between the signature orthogonal patterns and different pedestrian speeds. As discussed above, this training of the NN is typically performed externally to the local smartphone and headset devices.

These signature patterns in the data obtained from the secondary sensors on the headset during the first time period are associated with the reliable trajectory that was obtained by the GNSS sensor 20 on the smartphone. Hence, the NN is able to learn the signature patterns that are associated with a pedestrian's speed and his or her direction of motion in the sensor frame S'.

At step 205, the most up-to-date version of the trained machine learning algorithm is periodically downloaded to the smartphone 100 and headset 110, with the downloaded instance of the algorithm schematically illustrated at 46 in FIGS. 2a and 2b.

In embodiments, the invention may make use of a "generic" machine learning algorithm that is trained using data from a plurality of different users, with the advantage that the training is based on a large amount of training data. However, preferably, such a generic algorithm may be tailored to each individual user (e.g. by using weightings based on the origin of the training data) such that motion characteristics individual to each user may be represented in the tailored algorithms. In other embodiments, the invention may provide an individual "bespoke" machine learning algorithm for each user based on that user's data only.

In this embodiment, the first machine learning algorithm is a neural network (NN). The NN comprises convolutional and recurrent stages that are trained using the training data generated in step 203. During the second time period (described in more detail below), data obtained by the secondary sensors 12', 14', 16', 18' of the headset 110 is input to the trained NN which subsequently makes accurate predictions of at least one of a direction of motion, speed, velocity, motion context, and position context based on the temporal patterns observed in the data. Frames of data obtained from the secondary sensors during the second time period are passed to the trained NN, which is represented by a system of weighting coefficients associated with each of the secondary sensors, and connected by a network of multiply and add operations. Output predictions from the NN are generating by applying these weightings and summations to the frames of input data obtained during the second time period.

Figure 4:
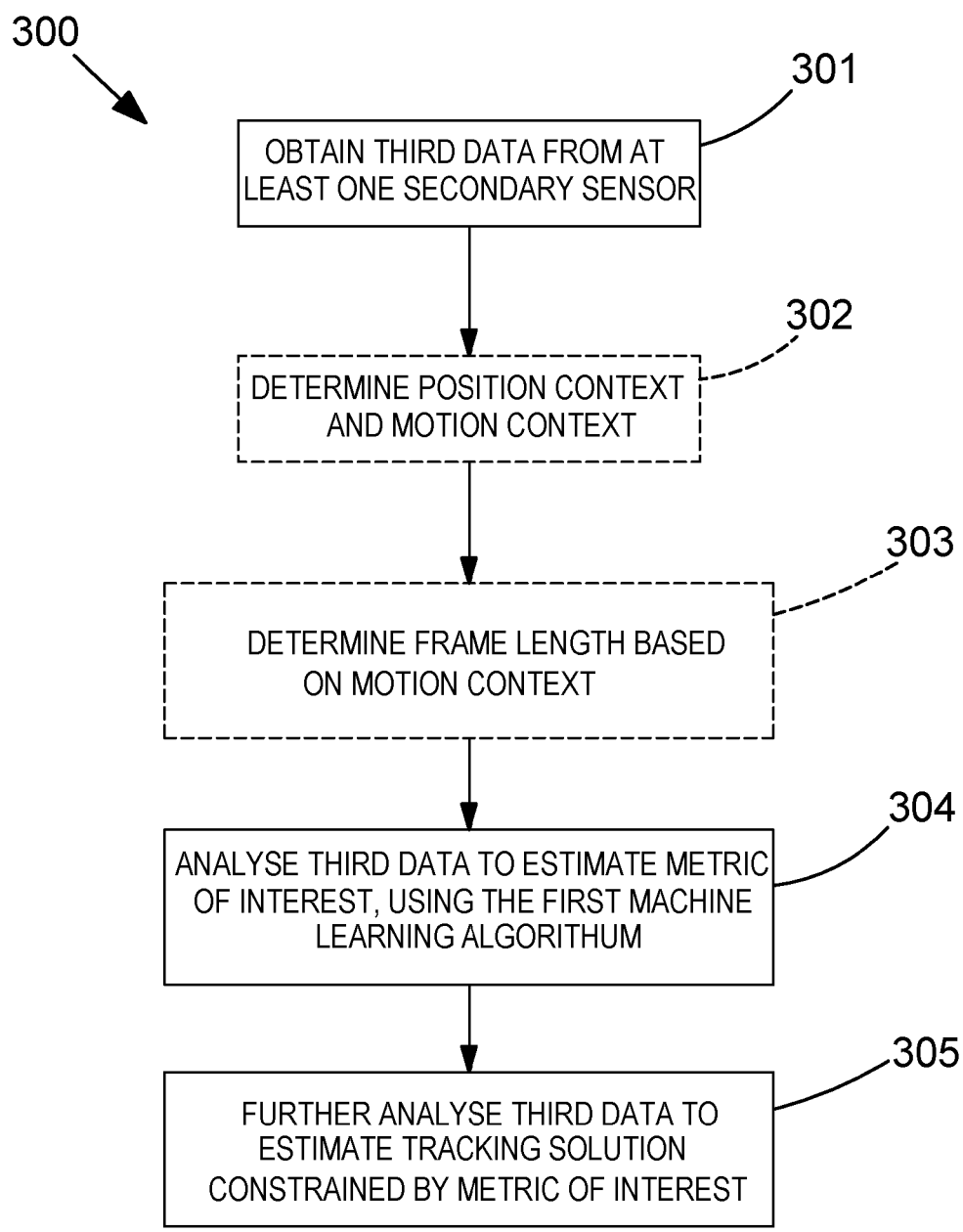
FIG. 4 is a flow diagram outlining a preferred series of method steps that may be performed during the second time period.

FIG. 4 is a flow diagram outlining the steps of a preferred embodiment of the method 300 performed during the second time period, during which time the GNSS sensor 20 is not operational. However, it will be appreciated that the method 300 may be used during time periods in which the GNSS sensor is operational. At step 301, third data are obtained from the secondary sensors mounted on the headset, i.e. from the accelerometer 12', gyroscope 14', magnetometer 16' and barometer 18'. As has been explained hereinabove, conventional attempts to determine a trajectory solely based on data from such sensors have been unsuccessful, particularly in scenarios where the platform and body are not in a strapdown or gimballed relationship.

Optionally, at step 302, a motion context and a position context during the second time period are determined. This is typically performed by analysis of the third data by the neural network 46, based on learned patterns in the third data, typically data obtained from the accelerometer 12' and gyroscope 14'.

Alternatively, these motion and position contexts may be determined by use of an appropriate look-up table. Such a look-up table comprises a plurality of predetermined motion and position contexts and associated secondary sensor data patterns (typically accelerometer and gyroscope data patterns), and may be stored in local storage. The third data obtained during the second time period from the headset (typically from the accelerometer 12' and gyroscope 14') may then be matched to the most likely motion and position contexts based on patterns in the obtained third data.

As a further alternative, a separate machine learning algorithm may be used, that has been trained on previously obtained training data. As a yet further option, the position context and motion context may be determined by user input. For example, the pedestrian P may input the required contexts via a graphical user interface (GUI) presented to the pedestrian during the second time period. Typically this will be a selection from a number of predetermined options.

Importantly, the motion context and position context during the second time period are determined based solely on the data obtained from the sensors mounted on the headset 110, with no external or aiding information (e.g. CCTV cameras) required.

The third data are analysed by the NN on a frame-by-frame basis. A frame (or "window") of third data comprises a time-ordered plurality of measurement values obtained by the at least one secondary sensor mounted on the headset. In the present embodiment where the machine learning algorithm is in the form of a neural network, each said frame of third data has the same, fixed, temporal length. The length of each frame of third data may be chosen based on the optimal frame length for use with the neural network.

Optionally, the method may include step 303 of determining a frame length based on the (optionally) determined motion context. Generally, it is desired that the direction of motion of the pedestrian does not change during a frame of obtained third data, as this can lead to difficulties in determining the direction of motion during that time. Hence, preferably, each frame of third data is chosen such that is does not contain a context change. For example, in a case where the pedestrian is determined as having a walking or running motion context, the temporal length of the frames of third data may be chosen to be shorter than a typical stride duration for the pedestrian—for example a frame length may be of the order of 0.1 seconds. Conversely, in other embodiments, if the motion context is determined to be that of a car driving along a straight road, the frames of data may be chosen to have a longer temporal length in order to reduce the processing power required.

The frames of third data may be chosen to overlap with each other, with multiple metric estimates obtained for the overlapping frames being averaged to give a more reliable estimate over a pedestrian's stride period as a whole (for example), as compared to a single frame having a temporal length spanning the stride period.

It is to be noted that the same determination of frame length is used when training the machine learning algorithm using the training data (step 204 in FIG. 3). In other words, the same frame length is used for the generated training data when training the NN as for the analysis of the third data during the second time period.

At step 304, the third data are analysed to estimate a first metric of interest, using the neural network. In this embodiment, based on the third data obtained from the secondary sensors on the headset, the trained NN outputs a velocity of the pedestrian P in the sensor frame S', for each frame of third data that is input to the NN. This velocity of the pedestrian for each frame of third data may be referred to as a motion model for the pedestrian during the second time period, which is then used to constrain the tracking solution, as described below.

At step 305, the estimated velocity solutions from the NN are then be passed to the tracking and navigation module 44. The tracking and navigation module 44 performs further analysis of the third data in order to estimate a trajectory of the pedestrian P during the second time period, which is constrained by the velocity predictions ("motion model") obtained from the NN. This analysis of the third data is typically performed using a Kalman filter, with the states tracked by the Kalman filter typically being orientation, velocity and position, as explained below.

The TSU obtains data from the secondary sensors 12', 14', 16', 18' on the headset 110 during the second time period. The data from these sensors are then used to estimate the orientation, position and velocity of the pedestrian P during the second time period using conventional inertial navigation techniques (e.g. integration of the accelerometer data whilst correcting for gravity in order to obtain velocity and position). These orientation, position and velocity estimates obtained using the secondary sensor measurements are referred to as the IMU solution. The third data obtained from the sensors of the IMU 10' are used to update the orientation, velocity and position states with each new accelerometer and gyroscope measurement.

As described above, the NN outputs a predicted velocity for each frame of third data in the headset sensor frame of reference, S', and thus these velocity predictions need to be transformed into the navigation frame N such that the trajectory of the pedestrian during the second time period may be determined in the navigation frame N. The tracked orientation of the IMU solution is used to determine a compass heading of the headset 110, and thus the yaw offset between the sensor frame S' and the navigation frame N. The velocity predictions obtained from the NN are then be transformed into the navigation frame of reference, N by the tracking and navigation module 44 using the determined yaw offset.

Once the velocity predictions from the NN have been transformed into the navigation frame of reference, N, these transformed velocity predictions are fused with the current IMU solution using the Kalman filter, resulting in corrections being applied to all of the tracked states (i.e. orientation, velocity and position). In this manner, the IMU solution is constrained by the velocity outputs from the NN, giving rise to an accurate tracking solution for the pedestrian during the second time period.

Thus, the output from the tracking and navigation module 44 is a series of 2D velocity, orientation and position estimates for each frame of third data, from which a 2D trajectory of the pedestrian in the navigation frame during the second time period may be estimated.

Other states may be tracked within the framework of the Kalman filter (e.g. sensor biases that may be estimated using techniques such as ZUPT) in order to further increase the accuracy and reliability of the pedestrian trajectory during the second time period. In some embodiments, if GNSS measurements become available during the second time period, these may also be fused with the IMU solution within the Kalman filter. However, the present invention is designed to provide reliable tracking solutions without the requirement for such GNSS data.

In the example embodiment discussed above, the output from the NN is a series of velocity estimates for each frame of obtained third data. In alternative embodiments, the NN may be used to estimate a direction of motion (in the headset frame of reference, S') for each frame of third data. The data obtained from the IMU 10' on the headset may be used to estimate a speed for each frame of third data using conventional techniques such as integration (i.e. without using the NN). Therefore, combining the speed estimates with the direction of motion estimates from the NN, the output from the tracking and navigation module 44 is a series of 2D velocity estimates for each frame of third data, which may be transformed into the navigation frame N such that the trajectory of the pedestrian may be estimated. Such alternative embodiments (where the NN is only used to estimate a direction of motion) may advantageously use less processing power than when the NN is used to generate velocity estimates.

Further techniques for analysis of the third data in step 305 are outlined below.

Figure 5:
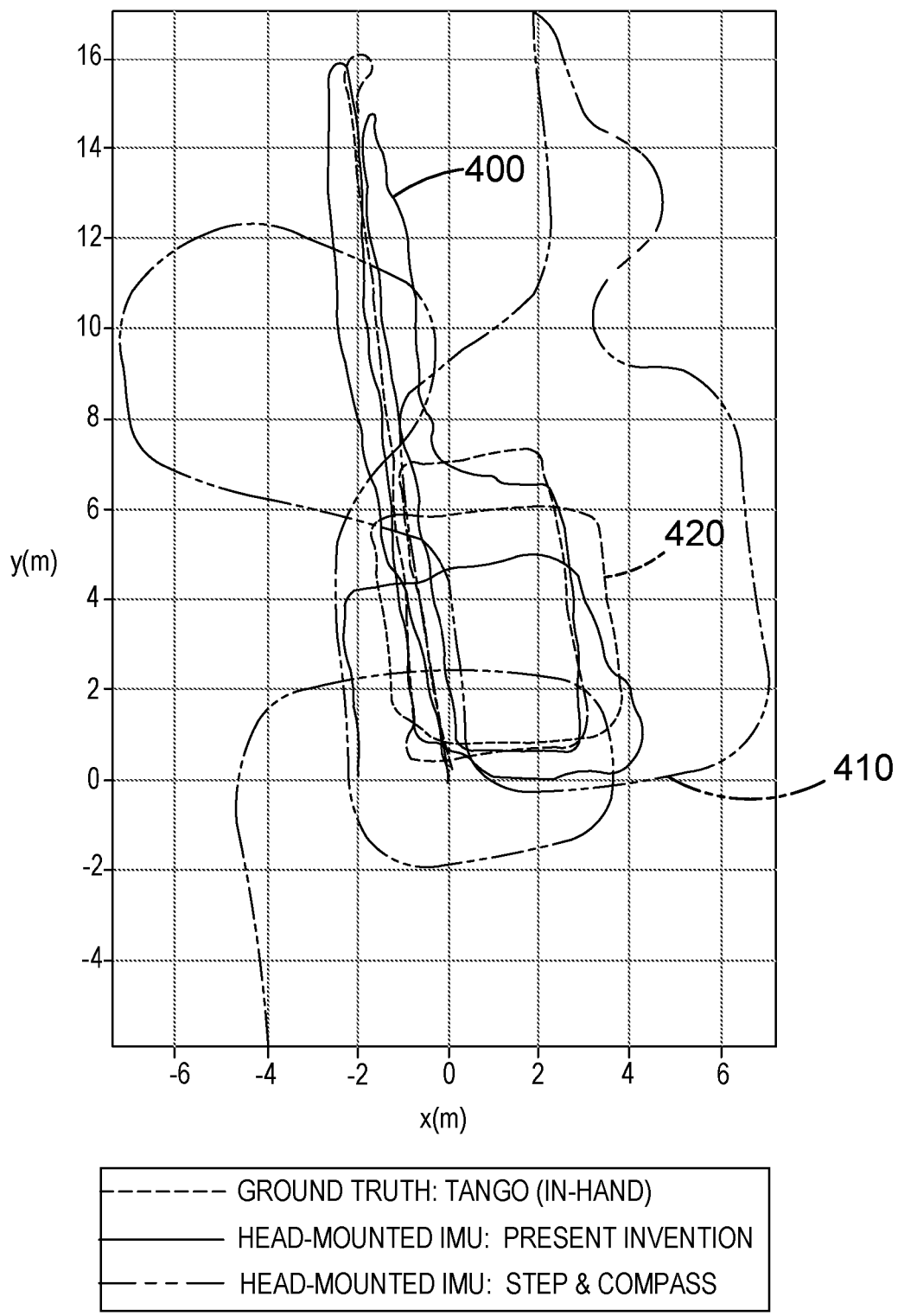
FIG. 5 is a diagram showing an estimated trajectory of a pedestrian obtained using the present invention.

FIG. 5 is a diagram showing the trajectory of the pedestrian (i.e. a series of position estimates) obtained using the present invention (400) using the configuration described above, i.e. when the pedestrian was wearing a headset 110 during a time period where no primary positioning unit was operational. For comparison, a trajectory (410) using conventional "dead-reckoning" (where direction of motion estimates were obtained using compass headings and step detection) is also shown, together with the ground truth obtained using a Google Tango® device (420). The x and y axes represent distance in the navigation frame of reference.

Here, the pedestrian was walking around a room within a building where GNSS data was not available such that the trajectory solution was obtained using data from the secondary sensors on the headset only. Training data were previously obtained during a first time period when the pedestrian wore the headset and also had an operational GNSS sensor located in his pocket to provide direction of motion and position measurements. The training data were obtained when the pedestrian was outside (such that the GNSS sensor has adequate satellite visibility and was thus operational).

During the second time period during which the illustrated traces were obtained, the trajectory 400 was obtained using the NN trained using the training data obtained during the first time period. As can be seen, the estimated trajectory 400 aligns favourably with the ground truth, and thus proved to be extremely robust to changes in head direction. In contrast, the trajectory 410 obtained using conventional techniques (in this case compass heading and step detection) was very unreliable in comparison to the ground truth, due to naïve inferences of changes in head direction as relating to a change in direction of motion.

In this example, as well as being used during the second time period to determine the trajectory of the pedestrian, the inertial sensors mounted on the headset may also be used to determine an orientation of the pedestrian's head. This may be done through analysis of data obtained from an accelerometer 12', gyroscope 14', and magnetometer 16' mounted on the headset for example. The orientation of a user's head in relation to his direction of motion may be a useful metric in the case of location based services or advertising for example.

In the embodiment described above, the primary positioning unit was a GNSS unit. However, in other embodiments, the primary positioning unit used to generate the training data during the first time period may be a visual odometry system configured to determine position, orientation and/or speed of the body from associated images obtained during the first time period (e.g. from CCTV images or use of a Google Tango platform).

Figure 6:
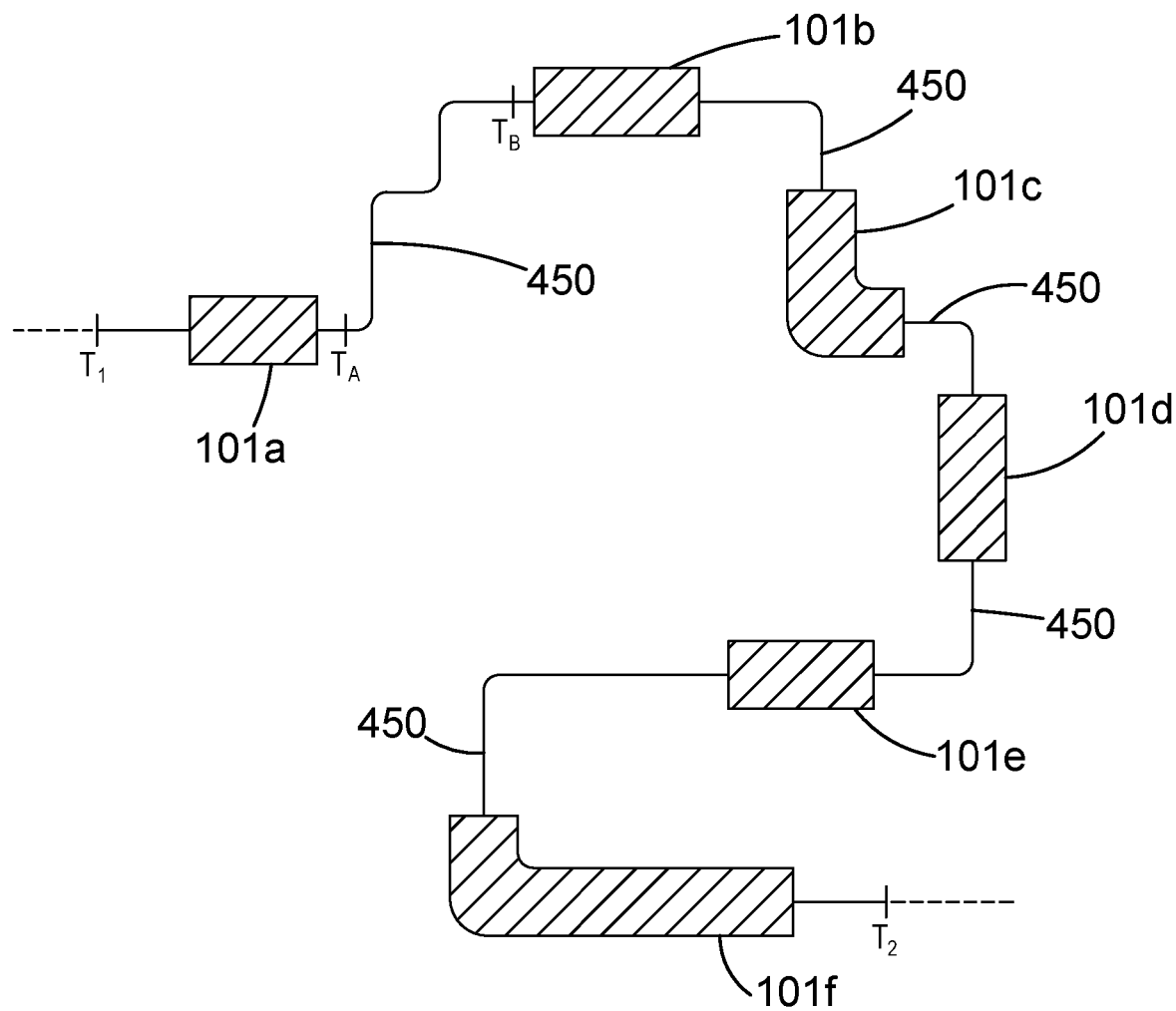
FIG. 6 is a schematic diagram showing how the trajectory of a pedestrian may be estimated using the present invention.

FIG. 6 schematically illustrates the evolution of the position of the pedestrian P as determined between two time instances $T_1$ and $T_2$. The hatched boxes 101a, 101b, 101c, 101d, 101e, 101f represent time periods in which the absolute position of the pedestrian has been determined with high confidence ("confident sections"), for example because of the availability of high quality GNSS data from the smartphone 100 carried by the pedestrian.

These confident sections are referred to as "first time periods" and the data obtained during these periods may be used to train the machine learning algorithm in the manner described above. This may include a determination of biases in the accelerometer 12, gyroscope 14 and magnetometer 16 sensors.

The line 450 between the confident sections represents the estimated trajectory of the pedestrian (i.e. the evolution of his/her position) as determined by the TSU 40 during periods of time when GNSS data are not available or is deemed unreliable ("second time periods"). For example, the time instances $T_A$ and $T_B$ are illustratively shown as defining a time period where the GNSS data were deemed to be too unreliable for determining the absolute position of the device. Metrics that may be used to invoke the rejection (or reduction in confidence) of GNSS data—and thus invoke a second time period—may include, for example, the number of satellites in use being fewer than a predetermined number, the signal strength of the GNSS data being below a predetermined threshold etc.

During the second time periods between the confident sections represented by the hatched boxes, data from the secondary sensors of IMU 10' on the headset 110 are analysed in order to estimate the trajectory of the pedestrian, with the trajectory solution being constrained by the output from the trained neural network in the manner described above.

Techniques for Estimating the Evolution of a Metric of Interest Using a Motion Model The present invention allows an accurate evolution of a metric of interest (typically a trajectory) to be determined. This may be during the first time period (e.g. for use as training data) and/or during the second time period as a tracking solution. The present invention is particularly beneficial as the trained machine learning algorithm provides a motion model (or parameters thereof) by which the tracking solution may be constrained. This is in contrast to conventional techniques where a motion model may need to be user input or inferred from obtained data without the trained knowledge of previous "journeys" represented in the trained machine learning algorithm.

The following description refers to techniques for using such motion models in order to estimate the evolution of a metric of interest, and refers to analysis of data in either the first or second time periods. However, for clarity of description, we refer to the first time period, for example in order to obtain a trajectory for use as training data.

Figure 7:
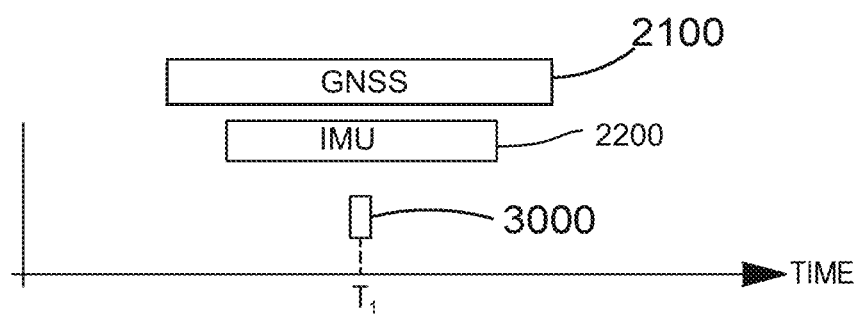
FIG. 7 schematically illustrates a technique for obtaining a position solution at a time instance.

FIG. 7 schematically illustrates a technique for obtaining a position solution for the smartphone 100 at a time instance T1 during the first time period using both data obtained from the GNSS sensor 20, and data obtained from the IMU 10 mounted on the smartphone.

A position solution for a plurality of time instances T1, T2, ... Tn may be obtained in the same manner in order to determine the trajectory during the first time period.

The position solution (represented at 3000) at time instance T1 is constrained by data obtained by the GNSS sensor 20 during a first time sub-period 2100 (referred to herein as "first sub-data"), and by data obtained by the secondary sensors of the IMU 10 during a second time sub-period 2200 (referred to herein as "second sub-data"). Here the time sub-period 2100 is longer than the time sub-period 2200 and is typically of the order of 1-10 seconds. The time sub-period 2200 is typically of the order of ~1 second. In this example, both the time sub-periods are shorter than the first time period.

The first sub-data and second sub-data are provided to the TSU 40, which calculates the desired solution at time instance T1. This is done by comparing the first sub-data and second sub-data with each other and/or a motion model of the body during the first time period in order to obtain corrected first sub-data and/or second sub-data.

The motion model typically comprises a determined position context of the smartphone with respect to the body, and motion context of the body. The motion model may also comprise at least one parameter that quantitatively represents the motion of the device. The at least one parameter quantitatively describes an aspect of the motion, for example, a step length or speed of the user.

The motion model may be pre-selected by a user of the smart phone, for example through interaction with an appropriate graphical user interface (GUI) presented to the user via screen 4. At the start of the first time period for example, the user may decide to go for a run, and select a motion model that comprises a motion context of "running".

Alternatively, the first and/or second sub-data may be analysed by TSU 40 to determine at least one of a position context and motion context for use in generating the position solution at a particular time instance. In particular, the second sub-data may be analysed by the TSU 40, and the data from the accelerometer and gyroscope sensors used to determine a current motion and/or position context. This is typically performed by matching patterns in the sensor data streams to particular motion and position contexts stored in a look-up table.

The data obtained from the accelerometer 12 may be used to determine a step cadence of the user and determine that the motion context is "walking", and furthermore that the step length of the user is 0.8 m. In addition to data obtained from the gyroscope sensor 14 that may be used to determine a position context, a light sensor 30 may detect minimal or no light during the time period 2200, and it can therefore be inferred that the smart phone 100 is in an enclosed space such as a pocket or a bag if the time is during daylight hours. Therefore, the second time sub-period 2200 can be thought of as providing a context, or "motion model" under which the data from the first time sub-period 2100 is processed to provide the position solution.

The first and second sub-data may be compared with each other and/or the motion model. Such analysis is performed by the tracking and navigation module 44 of the TSU 40 and may comprise self-consistency analysis (analysing the data obtained by a sensor across the respective time period) and cross-reference analysis, where the data from one sensor is compared with the data from another sensor and/or the motion model. The analysis performed by the tracking and navigation module may comprise analysing the obtained data forward and/or backwards in time, or as a batch process.

Take, for example, a situation where the motion model has a motion context determined as "walking", but on analysis of the first sub-data obtained from the GNSS sensor, a data event is observed that does not fit with such a walking motion model (e.g. a sudden shift in position by 50 m). This data event can be flagged as unreliable and hence used to provide corrected first sub-data from which the final position solution can be provided by the TSU 40.

A particular advantage of the present technique, as seen in FIG. 7 for example, is that the first 2100 and second 2200 time sub-periods extend into the future with respect to the time instance T1. The tracking solution is not always required to be determined instantaneously, and the use of data analysed in time windows that extend into the past and/or future with respect to a particular time instant enables a more accurate and reliable tracking solution to be obtained. The time lag between the end of the time windows 2100, 2200 and the time instance T1, may be 1 second or longer.

As will be appreciated, during the initial training of the machine learning algorithm, the motion model used for the training data will be defined without using the outputs from the algorithm as at this stage it is untrained. However, as the machine learning algorithm is trained over time, it may be used to provide motion model parameters during further first time periods in order to further refine the training data.

For example, the motion model parameters for a particular user and device/sensor combination may be automatically learned by the machine learning algorithm 46 and refined over a plurality of such journeys spanning a wide range of motion and position contexts. For example, it may be determined that after a plurality of journeys, a reliable step length for the user of a smart phone is 0.75 m rather than the initially-determined 0.8 m, thereby providing more accurate navigation solutions. The motion models and their various parameters may be stored in the local storage 5 on the device, or by other addressable storage means (e.g. through use of a client-server system), and indexed by position context and/or motion context. Subsequently, a stored motion model and its corresponding parameters may be automatically selected from the addressable storage when a particular motion and/or position context is determined.

The motion model and associated parameters may be further indexed by device and/or user, such that, in general, a motion model appropriate for a device and its current user may be selected automatically.

The tracking and navigation module 44 of the TSU 40 provides a position solution for a plurality of time instances in order to determine a trajectory of the device during the first time period.

Figure 8:
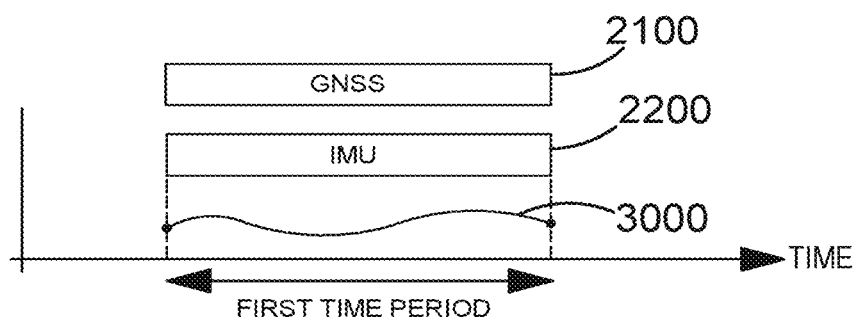
FIG. 8 schematically illustrates a technique for obtaining a trajectory solution using a batch process.

As shown in FIG. 7, position solutions at a plurality of time instances may be obtained by analysis of "rolling" windows of first and second sub-data. In other embodiments, the first and second time sub-periods 2100, 2200 may be substantially the same temporal length as the first time period, with the trajectory solution obtained by a batch process analysis of the entire dataset, as schematically illustrated in FIG. 8.

Figure 9:
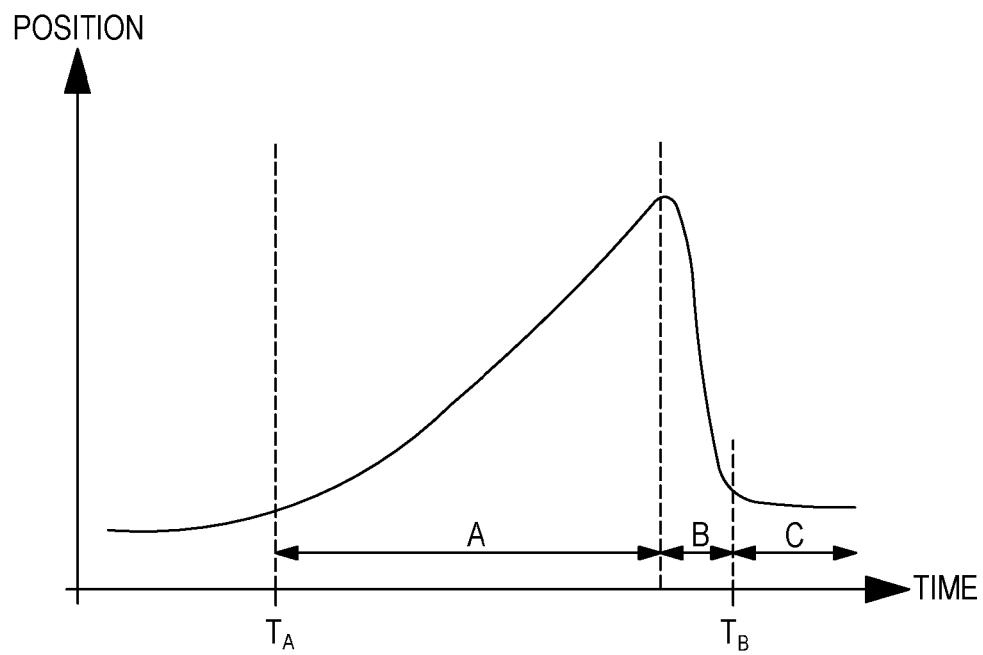
FIG. 9 schematically illustrates example position data obtained by a GNSS sensor between two time instances.

The analysis performed by the tracking and navigation module 44 may comprise processing the obtained data forwards and backwards in time, which allows any asymmetries in them to be used in determining their reliability and accuracy. FIG. 9 schematically illustrates one-dimensional position data obtained by the GNSS sensor 20. In this example the plotted change in position between the time instances $T_A$ and $T_B$ is caused by erroneous position data. When processing the data forwards in time, the gradual change in position over the time period A may initially be seen as a possible "allowed" motion of the device (the allowed motions being constrained, for example, by the current motion model and/or measurements from the secondary sensors). In such circumstances the erroneous GNSS position data from time period A is used to generate the navigation solution. The rapid change in position over time period B falls outside the allowed range of motion of the device, indicating there is a potential problem with the GNSS position data.

However, with just the forward-in-time processing it is unclear whether the data before or after time instance $T_B$ is in error. In a naïve system that only uses forwards-in-time analysis some or all of the "accurate" position data after time instance $T_B$ (illustrated here at "C") may be rejected, as these are now inconsistent with the navigation solution that has been corrupted by the erroneous data from time period A. In extreme cases the system might never recover the true navigation solution. By applying backwards-in-time processing to the same data (i.e. from $T_B$ to $T_A$), the almost discontinuous jump in position over the time period B is detected as being inconsistent with the allowed motion of the device, and consequently the position data is ignored (or assigned lower confidence) when combining data to obtain the navigation solution. This continues until such times as the position data is deemed consistent with the current navigation solution and the "allowed" motion of the device from the motion model. For example, in FIG. 9 all or most of the erroneous position data between times $T_B$ to $T_A$ would be correctly ignored (or given lower confidence) by the TSU 40 during backwards-in-time processing.

The analysis may comprise iteratively processing the obtained data forward and/or backwards in time. For example, confidence thresholds applied to an initial pass of the data may be such that all of the obtained data is allowed to be used for the trajectory solution provided by the tracking and navigation module 44. Of course, these data may include erroneous results such as the GNSS data obtained between time instance $T_A$ and $T_B$ depicted in FIG. 9; however, it is important not to lose data that may represent the actual motion taken by the device. On subsequent passes of the data, those from particular time periods (such as between $T_A$ and $T_B$) may not meet a new confidence threshold determined after the first pass, and are therefore ignored or corrected for. The benefit of processing data backwards in time rather than just using multiple passes forwards in time is that the uncertainty on any derived parameters increases over time in the absence of measurements. Therefore parameters can be better estimated overall in regions such as between $T_A$ and $T_B$ by processing the data either side of that region in both directions and combining the estimates provided by these two passes via a weighted mean or similar calculation.

Confidence thresholds may be set initially according to the known statistical noise properties of the device sensors, or from information derived from other sensors. For example, the accelerometer 12 may provide acceleration information in order to set thresholds on the expected variation in the GNSS frequency measurements during dynamic motions. On a subsequent pass through the data, the biases on the accelerometer may be known more accurately (for example, zero velocity update analysis may be performed during an initial analysis which reveals bias information). This means that the acceleration data is more accurate and reliable and therefore the confidence threshold on the expected frequency variation can be tighter (i.e. smaller variation). As a result, any error in frequency measurement that was allowed during the first pass of the data may now be ignored on the second pass due to the tighter (more confident) confidence thresholds.

Referring back to FIG. 9, as discussed above, on the first pass of the data, the initial confidence thresholds may be such that the GNSS data obtained between time instances $T_A$ and $T_B$ are seen as being consistent with the "allowed" motion of the device from the motion model. During the course of the first-pass processing, better estimates of the secondary sensor biases are determined, which can be used on subsequent passes of the data to provide more accurate secondary sensor data and, consequently, tighter confidence thresholds for other sensor data. For example, on a subsequent pass, the GNSS position data between time instances $T_A$ and $T_B$ might now be found to be inconsistent with the more tightly constrained allowed motion of the device, and, as a result, be filtered out of (or assigned lower confidence in) the final trajectory solution.

Confidence thresholds and the related analyses forwards and backwards in time may be applied to sensor data as described, and also to derived data and metrics of interest, including platform states, pose, and derived or latent variables such as sensor biases and calibration parameters.

Referring back to FIG. 7, the durations of the first and second time sub-periods 2100, 2200 are chosen so as to allow for optimal assessment by the tracking and navigation module 44 of the reliability and accuracy of the data obtained from the device sensors.

Furthermore, in some embodiments, the durations of the first and/or second time sub-periods 2100, 2200 may be dynamically changed in response to the assessment by the module 44. For example, the second time sub-period 2200 may be extended because of the erroneous data determined in time sub-period 2100, such that the extended time sub-period allows for a more reliable interpretation of the data (for example so as to automatically select a motion model).

As is schematically seen in FIG. 7, the first and second time sub-periods 2100, 2200 may extend into the future with respect to the time instance T1. In other words, when determining a navigation solution at time instance T1, data in the future with respect to T1 is used to constrain the solution. This provides a more accurate determination of the evolution of the metric of interest as compared to instantaneous solutions, as constraints may be interpolated for future time periods with respect to the time instance $T_1$, rather than simply extrapolated. In other words, the extension of the second time period into the future with respect to the time instance $T_1$ allows for a more accurate context, or "overall picture" of the data from which the evolution of the metric of interest is to be determined.

Figure 10:
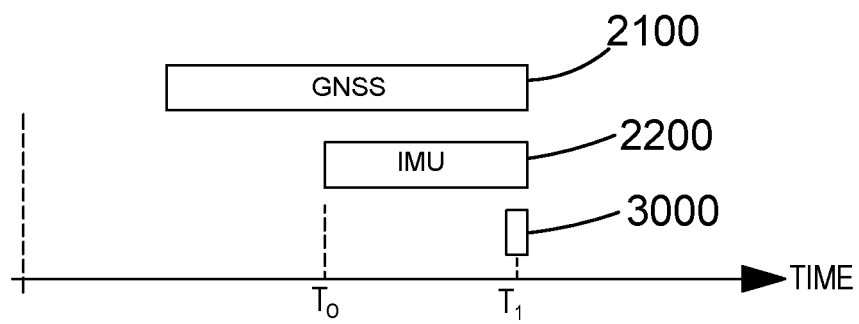
FIG. 10 schematically illustrates obtaining a trajectory solution in near real time.

However, there are some situations, for example navigation, where real-time information may be desired. In these cases, the time instance $T_1$ may be at, or within a small interval behind, present time, as schematically illustrated in FIG. 10. The relative positions of the second time sub-period 2100 and first time sub-period 2200 are also shown, with both time periods ending at time $T_1$ and only extending into the past with respect to $T_1$.

Therefore, the trajectory of the device may be provided to the user in near-real-time, with the solution for the present time only constrained by past data. However, advantageously, position solutions for previous times may be continually updated as new data are obtained. For example, at time instance $T_0$, both the first and second time periods extend into the future with respect to $T_0$, and therefore at $T_0$, a more accurate and reliable position of the device at $T_0$ may be determined as compared to the solution determined within the small interval behind at the time instance $T_0$ itself.

In this manner, the invention provides for near-real-time determination of the evolution of a metric of interest, as well as an improved determination of said evolution over time as more data are obtained.

Figure 11:
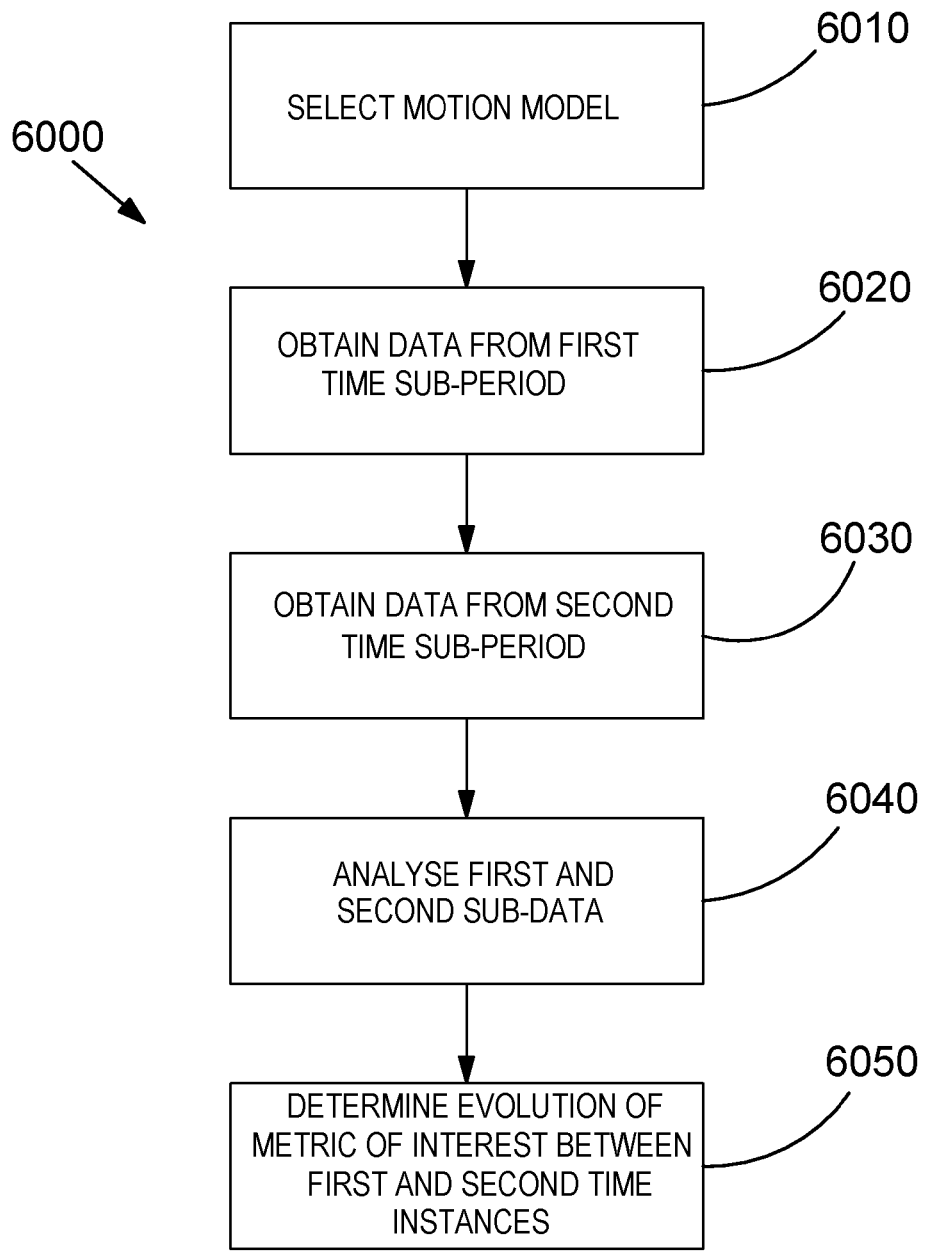
FIG. 11 is a flow diagram outlining the main steps of one embodiment of the invention for determining the evolution of a metric of interest.

FIG. 11 is a flow diagram 6000 outlining the main steps of one embodiment of the invention for determining the evolution of a metric of interest (such as a trajectory) using a motion model. At step 6010, a user of the smartphone 100 preselects a motion model, typically by interaction with a suitable GUI via a screen of the device. As discussed above, a motion model may comprise a motion context, a position context and at least one quantitative parameter describing the motion. At step 6010, the user may pre-select at least one of these components. For example, the user may simply select a motion model having a motion context of "running".

At step 6020, the TSU 40 obtains data from the first time sub-period, and at step 6030 obtains data from the second time sub-period. Although these are set out in method 6000 as separate steps, it will be appreciated that the TSU 40 may obtain the data from the first and second time sub-periods substantially simultaneously. In other embodiments the data from the second time sub-period may be obtained before the data from the first time sub-period.

At step 6040, the first and second sub-data are analysed by the tracking and navigation module 44, as described above, and at step 6050, the module 44 determines the evolution of the metric of interest between first and second time instances (e.g. a trajectory). In the series of steps set out in method 6000, the motion model is shown as being pre-selected before the obtaining of data. However, it will be appreciated that the motion model may be selected by the user after the obtaining of the data, or may be determined from an analysis of the data itself (e.g. using the trained machined learning algorithm). Typically, step 6040 of analysing the first and second sub-data comprises comparing the first and second sub-data with each other and/or the motion model.

Figure 12:
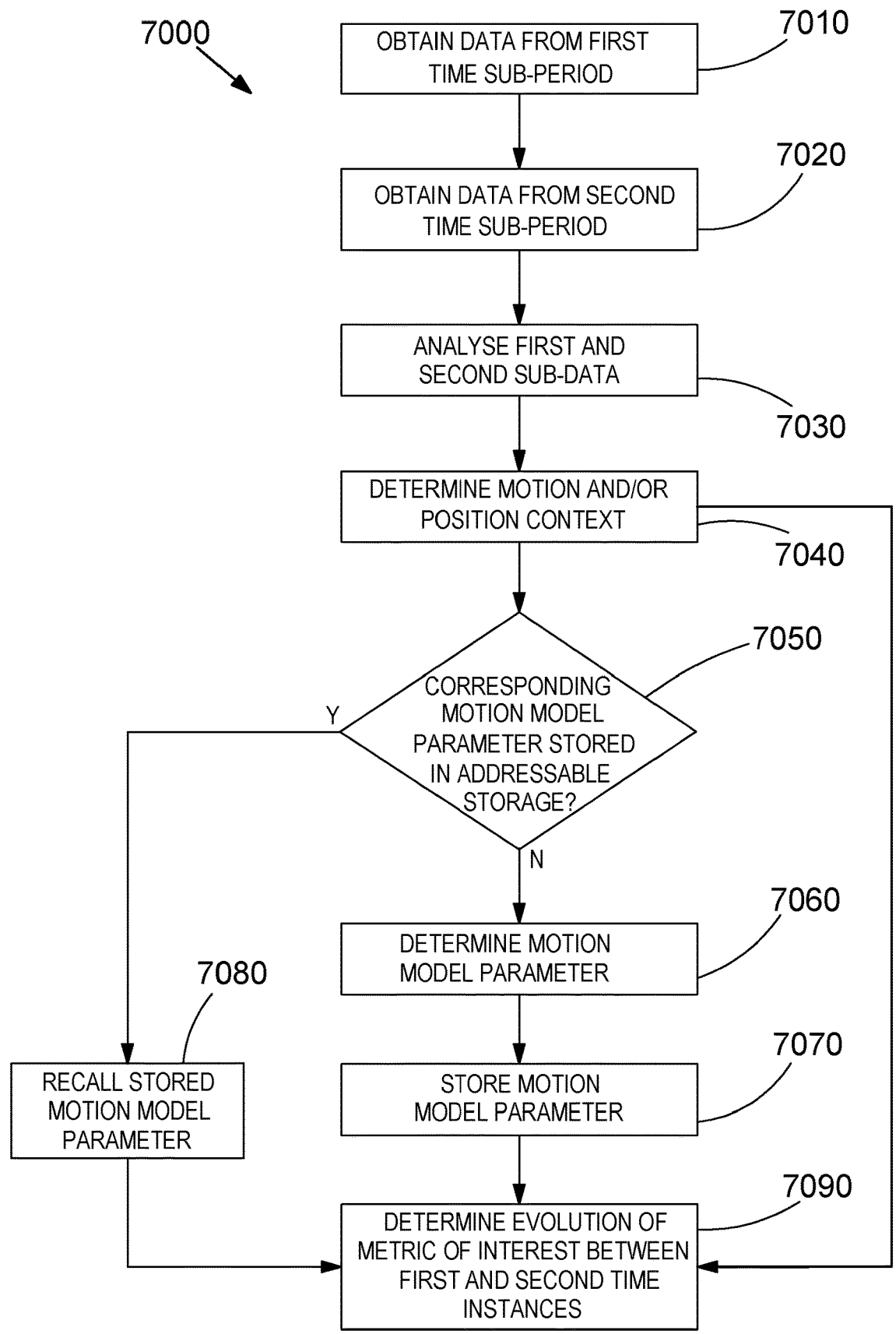
FIG. 12 is a flow diagram outlining the main steps of a further embodiment of the invention for determining the evolution of a metric of interest.

FIG. 12 is a flow diagram 7000 outlining the main steps of a further embodiment of the invention for determining the evolution of a metric during, in this case where the motion model is automatically selected from analysis of the first and second sub-data. At step 7010, the TSU 40 obtains first sub-data from the first time sub-period, and at step 7020 obtains second sub-data from the second time sub-period. In the same manner as described above in relation to FIG. 12, steps 7010 and 7020 may in some cases occur substantially simultaneously or in reverse order.

At step 7030 the first and second sub-data are analysed by the tracking and navigation module 44.

At step 7040, from the analysis performed at step 7030, the motion and/or position context of the device is determined. This may be determined by the trained machine learning algorithm for example. In such embodiments, the method may then proceed to step 7090 where the trajectory is determined based on an analysis of the first and second sub-data, and the determined motion and/or position context.

In other embodiments, the method proceeds to decision step 7050, where it is determined whether or not a motion model parameter that corresponds to the current user, device, and the position and/or motion context that was determined in step 7040, is stored in addressable storage (for example local storage 5). If such a motion model does exist, this is recalled (step 7080) and at step 7090 the navigation and tracking module 44 determines the evolution of the metric of interest between the first and second time instances, with the evolution constrained by the first data, second data and the motion model including the at least one parameter recalled from local storage. The quantitative motion model parameter may comprise an estimate of the step length of the user for example. As has been discussed above, advantageously such a parameter may have been refined during previous analyses of data obtained by the device for the user, for example using the trained machine learning algorithm.

If, at step 7050, it is determined that no corresponding motion model parameter exists, then the method moves to optional step 7060 where the determined motion and/or position context is used to determine at least one parameter associated with the motion of the device. This may be performed using the trained machine learning algorithm for example. Optionally, this may be stored in addressable storage (step 7070), indexed by the determined motion and/or position context and the identity of the device. Subsequently, at step 7090 the module 44 determines the evolution of the metric of interest between time instances $T_1$ and $T_2$, with the evolution constrained by the first data, second data and motion model.

Figure 13:
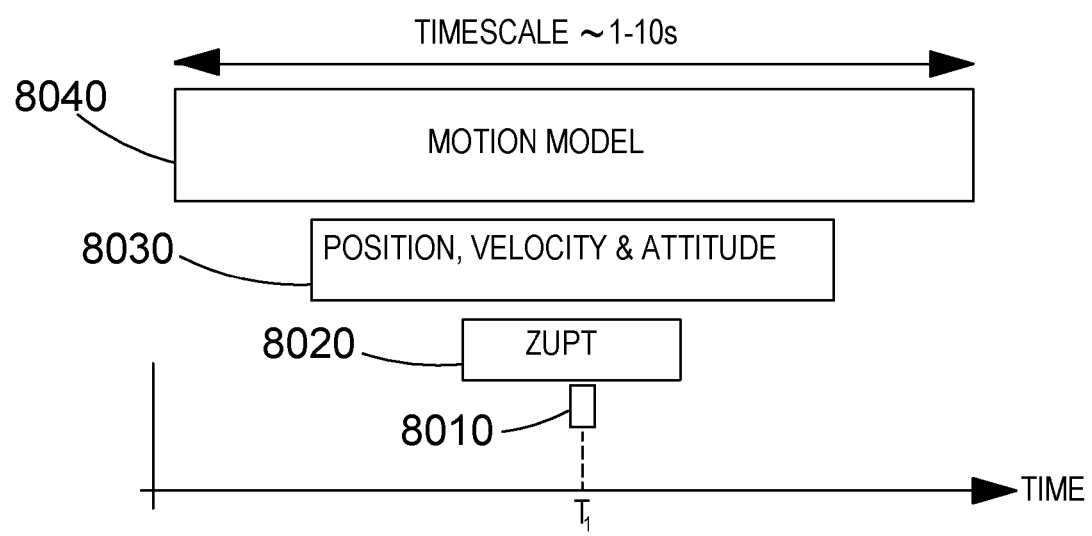
FIG. 13 is a schematic overview of how data from at least one sensor may be used to determine the evolution of a metric of interest.

FIG. 13 is a schematic overview of how data from one or more sensors may be used to determine a tracking or navigation solution (e.g. for use as training data), for example for the smart phone 100 described above during the first time period. Box 8010 schematically represents a position solution generated by the TSU 40, at time instance $T_1$, which here is at, or within a small interval behind, the present time. The position solution of the TSU is based on data from the secondary sensors of IMU 10 which may have sampling rates in the region of ~100-1000 samples per second, and so the time period of box 8010 may be of the order of ~1-10 ms. In conventional solutions, this "instantaneous" data obtained from an IMU would simply be used to output the position solution for that instant in time, and therefore the evolution of the position solutions would be subject to large error drift.

As schematically shown in FIG. 13, the present invention may utilise data obtained from past and future time periods with respect to the TSU time instance $T_1$ in order to constrain the tracking solution at that time instance. Information from any of the boxes 8010 to 8040 may be analysed intra- and inter-box using a variety of methods (e.g. using a Kalman filter) in order to optimally filter and combine all of the available data, thus resulting in an improved tracking solution. In this example, box 8020, labelled "ZUPT", represents data obtained by the IMU 10, and which has been analysed to determine whether or not the IMU 10 was stationary at time instances during the time interval represented by box 8020. Periods of detected zero velocity may be used, for example, to reset the velocity measurement being tracked by the TSU, or to determine biases in the inertial sensors of the IMU 10 which may then be used to constrain the TSU solution at time instance $T_1$.

Box 8030 may represent data obtained from a GNSS sensor that can be used to provide position and velocity data to further constrain the TSU solution. Additionally, information from box 8020 may be used to filter out GNSS data in box 8030 that is in violation of a confidently determined zero velocity condition. Attitude data may be obtained from an accelerometer and/or a gyroscope and/or magnetometer sensor.

A motion model schematically illustrated at box 8040 may have been pre-selected or automatically determined (for example through analysis of the raw IMU data using the trained machine learning algorithm, or from the position, velocity and attitude data). The motion model may include one or more parametric models describing some aspect of the user's motion. Analyses of sensor data contained in one or more of the boxes 8010 to 8040 may be performed to extract values subsequently used as input to such models. For example, stepping cadence may be extracted from accelerometer data, and subsequently input to a function modelling pedestrian step length, or raw accelerometer and gyroscope data may be passed to the trained neural network capable of predicting speed and direction of motion. As has been described above, the motion model at box 8040 may be used to aid filtering of input sensor data and constrain the navigation or tracking solution.

FIG. 13 illustrates boxes 8020, 8030 and 8040 as having different sizes (i.e. time periods), but this does not necessarily have to be the case and is for the purposes of illustration only. However, advantageously, the data obtained and used to constrain the TSU solution at time instance $T_1$ have been obtained over longer time periods, and extend into both the past and future, with respect to time instance $T_1$. The evolution of the metric of interest (here positioning data determined from the TSU) may be determined between first and second time instances by combining the positioning solution obtained at a plurality of such time instances.

As will be appreciated, the diagram of FIG. 13 is for illustrative purposes only, and the boxes may represent different sensor data streams and analyses. For example, during the second time period, there may be no data available from a primary positioning unit (e.g. GNSS sensor).

The main example used in the detailed description has been that of data obtained from a first device (smartphone) and a second, independent, device (headset) being used to train a machine learning algorithm such that data obtained from the second device may be used to provide a reliable estimation of a metric related to the motion of a body. In another example, a vehicle has secondary sensors mounted onto its chassis (the second platform) which measure the vehicle's acceleration and rate-of-turning. The driver carries a smartphone in his pocket (the first platform) which has a built-in GNSS receiver acting as the primary positioning unit, as well as sensors measuring acceleration, rate of turning etc. Data obtained from the sensors on the first platform during a first time period when the GNSS receiver is operational may be used to train a machine learning algorithm such that the sensors on the vehicle chassis may maintain a reliable track of the vehicle during a second time period.

Further preferred aspects of the invention will now be set out in the following numbered clauses. These aspects are particularly relevant to determining the evolution of a metric of interest during the first and/or second time periods (e.g. a training metric during the first time period, or for performing analysis of the third data obtained during the second time period).

[Numbered clause 1] A method of combining data from at least one sensor configured to make measurements from which position or movement may be determined, in order to determine the evolution of a metric of interest over time, comprising:

obtaining, in a first time period, first data from a first sensor mounted on a first platform;

obtaining, in a second time period, second data from said first sensor and/or a second sensor mounted on the first platform or a second platform;

determining the evolution of a metric of interest between first and second time instances, wherein at least one of the first and second time instances is within at least one of the first and second time periods, and;

wherein the evolution of the metric of interest is constrained by at least one of the first data, second data and a motion model of the first and/or second platform.

[Numbered clause 2] The method of clause 1, further comprising analysing the first and/or second data over at least a part of the respective first and/or second time period in order to assess the reliability and/or accuracy of the first and/or second data.

[Numbered clause 3] The method of clause 1 or clause 2, further comprising analysing the first and/or second data over at least a part of the respective first and/or second time period in order to obtain corrected first data and/or corrected second data, and wherein;
the evolution of the metric of interest is constrained by at least one of the corrected first data, corrected second data and a motion model of the first and/or second platform.

[Numbered clause 4] The method of clause 2 or clause 3, wherein the step of analysing the first and/or second data comprises performing self-consistency checks.

[Numbered clause 5] The method of any of clauses 2 to 4, wherein the step of analysing the first and/or second data comprises comparing said data with each other and/or the motion model.

[Numbered clause 6] The method of any of clauses 2 to 5, wherein the durations and/or amount of overlap of the first and second time periods with respect to each other are chosen so as to allow for optimal analysing of the first and/or second data.

[Numbered clause 7] The method of clause 6, wherein the duration of a time period and its amount of overlap relative to the other time period(s) and the first and second time instances is dynamically adjusted in response to changes in the reliability and/or accuracy of the associated sensor data.

[Numbered clause 8] The method of any of the preceding clauses, wherein at least one of the first and second data are analysed backwards in time.

[Numbered clause 9] The method of any of the preceding clauses, wherein the first data and/or second data are iteratively analysed forwards and/or backwards in time.

[Numbered clause 10] The method of clause 9, wherein a first analysis of the first and/or second data is based on at least one confidence threshold and the at least one confidence threshold is modified after the first analysis; wherein a subsequent analysis of said first and/or second data is based on the modified confidence threshold.

[Numbered clause 11] The method of any of the preceding clauses, wherein the motion model comprises at least one of a motion context component comprising a motion context of the first platform and/or second platform, and a position context component comprising a position context of the first platform and/or second platform.

[Numbered clause 12] The method of any of the preceding clauses, wherein the motion model comprises at least one parameter that quantitatively describes an aspect of the motion, and/or at least one function that may be used to determine a parameter that quantitatively describes an aspect of the motion.

[Numbered clause 13] The method of clause 12, wherein the at least one parameter is one of: a pedestrian step length, a pedestrian speed, a pedestrian height, a pedestrian leg length, a stair rise, a stair run or a compass-heading to direction-of-motion offset.

[Numbered clause 14] The method of clause 12 or clause 13, wherein the at least one function is a function determining the pedestrian step length or speed.

[Numbered clause 15] The method of any of the preceding clauses, wherein at least one component of the motion model is manually defined by a user.

[Numbered clause 16] The method of any of the preceding clauses, wherein at least one component of the motion model is automatically determined from an analysis of the first and/or second data.

[Numbered clause 17] The method of any of the preceding clauses, wherein at least one component of the motion model is automatically determined from an analysis of data obtained from the first and/or second sensor during at least one previous determination of an evolution of a metric of interest.

[Numbered clause 18] The method of any of clauses 11 to 17, wherein the at least one parameter and/or function of a given motion model is stored in an addressable storage indexed by at least one of the motion context, the position context or an identity of the first and/or second platform.

[Numbered clause 19] The method of any of the preceding clauses, wherein the motion model of the first and/or second platforms is a pre-selected motion model.

[Numbered clause 20] The method of any of the preceding clauses, wherein the motion model is an automatically selected motion model.

[Numbered clause 21] The method of clause 20 when dependent upon clause 11, wherein the motion model is automatically selected by determining at least one of the motion context and position context between the first and second time instances through analyses of the data obtained by the first and/or second sensors during the first and/or second time periods, and/or during the time period between the first and second time instances.

[Numbered clause 22] The method of clause 21, further comprising using at least one of an identity of the first and/or second platform, the determined motion context and the determined position context, to recall from addressable storage at least one motion model parameter and/or function indexed using at least one of an identity of the first and/or second platform, a motion context and a position context.

[Numbered clause 23] The method of clause 20 or 21, further comprising determining at least one motion model parameter and/or function for the motion model and storing said at least one motion model parameter and/or function in addressable storage, indexed using at least one of an identity of the first and/or second platform, a motion context and a position context.

[Numbered clause 24] The method of any of the preceding clauses, wherein the constraining of the evolution of the metric of interest comprises determining a measurement bias of the first sensor and/or second sensor and correcting for said bias.

[Numbered clause 25] The method of any of the preceding clauses, wherein the constraining of the evolution of the metric of interest comprises determining at least one data point of the first and/or second data that does not correspond to the motion model, and correcting for said at least one data point.

[Numbered clause 26] The method of any of the preceding clauses, wherein the second data is obtained from a second sensor mounted on the first platform.

[Numbered clause 27] The method of any of clauses 1 to 25, wherein the second data is obtained from a second sensor mounted on a second platform different from said first platform.

[Numbered clause 28] The method of clause 27, wherein the first and second platforms have at least one component of motion in common.

[Numbered clause 29] The method of clause 27 or clause 28, wherein the first and second platforms are mounted on the same body of interest.

[Numbered clause 30] The method of any of the preceding clauses, wherein the first and second time periods at least partially overlap.

[Numbered clause 31] The method of any of clauses 1 to 29, wherein the first and second time periods do not overlap.

[Numbered clause 32] The method of any of the preceding clauses, wherein at least one of the first and second time periods extends into the future with respect to the second time instance.

[Numbered clause 33] The method of any of clauses 1 to 31, wherein the first and/or second time period does not substantially extend into the future with respect to the second time instance.

[Numbered clause 34] The method of any of the preceding clauses, wherein the evolution of the metric of interest is calculated in near-real-time.

[Numbered clause 35] The method of any of clauses 1 to 33, wherein the metric of interest is calculated in a batch process.

[Numbered clause 36] The method of any of the preceding clauses, wherein the second time period is longer than the first time period.

[Numbered clause 37] The method of any of the preceding clauses, wherein the second data is obtained from a second sensor different from the first sensor, and the first sensor has a faster data sampling rate than the second sensor.

[Numbered clause 38] The method of any of the preceding clauses, wherein the first sensor is an inertial measurement unit.

[Numbered clause 39] The method of any of the preceding clauses, wherein the first sensor is a part of an inertial navigation system.

[Numbered clause 40] The method of any of the preceding clauses, wherein the first sensor comprises at least one of: an accelerometer, a gyroscope, a magnetometer, a barometer, a GNSS unit, a radio frequency receiver, a pedometer, a camera, a light sensor, a pressure sensor, a strain sensor, a proximity sensor, a RADAR, and a LIDAR.

[Numbered clause 41] The method of any of the preceding clauses, wherein the second sensor comprises at least one of: an accelerometer, a gyroscope, a magnetometer, a barometer, a GNSS unit, a radio frequency receiver, a pedometer, a camera, a light sensor, a pressure sensor, a strain sensor, a proximity sensor, a RADAR, and a LIDAR.

[Numbered clause 42] The method of any of the preceding clauses, further comprising obtaining, in a third time period, third data from at least one of the first sensor, a second sensor and a third sensor; and wherein the determination of the evolution of the metric of interest is further constrained by the third data.

[Numbered clause 43] The method of any of the preceding clauses, wherein the metric of interest comprises at least one of: a position, a range, a speed, a velocity, a trajectory, an altitude, a compass heading, a stepping cadence, a step length, a distance travelled, a motion context, a position context, an output power, a calorie count, a sensor bias, a sensor scale factor, and a sensor alignment error.

[Numbered clause 44] The method of any of the preceding clauses, wherein the first platform is mounted on a body of interest.

[Numbered clause 45] A computer readable medium comprising executable instructions that when executed by a computer cause the computer to perform the method of any of the preceding clauses.

[Numbered clause 46] A system comprising:
at least one sensor configured to make measurements from which position or movement may be determined, in order to determine the evolution of a metric of interest, and;
a processor adapted to perform the steps of:
obtaining, in a first time period, first data from a first sensor mounted on a first platform;
obtaining, in a second time period, second data from said first sensor and/or a second sensor mounted on the first platform or a second platform, and;
determining the evolution of a metric of interest between first and second time instances, wherein at least one of the first and second time instances is within at least one of the first and second time periods, wherein;
the evolution of the metric of interest is constrained by at least one of the first data, second data and a motion model of the first and/or second platform.

[Numbered clause 47] The system of clause 46, wherein the first sensor is an inertial measurement unit.

[Numbered clause 48] The system of clause 46 or clause 47, wherein the first sensor is a part of an inertial navigation system.

[Numbered clause 49] The system of any of clauses 46 to 48, wherein the first sensor comprises at least one of: an accelerometer, a gyroscope, a magnetometer, a barometer, a GNSS unit, a radio frequency receiver, a pedometer, a camera, a light sensor, a pressure sensor, a strain sensor, a proximity sensor, a RADAR, and a LIDAR.

[Numbered clause 50] The system of any of clauses 46 to 49, wherein the second sensor comprises at least one of: an accelerometer, a gyroscope, a magnetometer, a barometer, a GNSS unit, a radio frequency receiver, a pedometer, a camera, a light sensor, a pressure sensor, a strain sensor, a proximity sensor, a RADAR, and a LIDAR.

[Numbered clause 51] The system of any of clauses 46 to 50, wherein the metric of interest comprises at least one of: a position, a range, a speed, a velocity, a trajectory, an altitude, a compass heading, a stepping cadence, a step length, a distance travelled, a motion context, a position context, an output power, a calorie count, a sensor bias, a sensor scale factor, and a sensor alignment error.

[Numbered clause 52] The system of any of clauses 46 to 51, comprising a second sensor mounted on the first platform.

[Numbered clause 53] The system of any of clauses 46 to 51, comprising a second sensor mounted on a second platform different from said first platform.

[Numbered clause 54] The system of clause 53, wherein the first and second platforms have at least one component of motion in common.

[Numbered clause 55] The system of clause 53 or clause 54, wherein the first and second platforms are mounted on the same body of interest.

The invention claimed is:
1. A computer-implemented method performed in a tracking system for tracking the motion of a body, as a function of time, the method comprising:
(a) during a first time period, obtaining first data related to the motion of a body from at least one primary positioning unit, wherein said at least one primary positioning unit is mounted on a first platform carried on the body, or wherein said at least one primary positioning unit is separate to the body, said at least one primary positioning unit being operational during the first time period, and wherein the at least one primary positioning unit is configured to provide position and navigation data directly;
  (b) during the first time period, obtaining second data from one or more secondary sensors configured to make measurements from which position or movement may be determined, whereby said second data comprises measurements from which position or movement may be determined, said one or more secondary sensors being mounted on one or more second platforms carried on the body, wherein the first platform and the one or more second platforms can move independently of one another;
  (c) generating first training data comprising the first data, the second data, which include orientation information of the first platform and the one or more second platforms, and at least one training metric related to the motion of the body during the first time period, wherein the training metric is determined using at least the first data obtained from the at least one primary positioning unit, and wherein the training metric includes a trajectory of the body during the first time period;
  (d) during a second time period, obtaining third data from the one or more secondary sensors, said third data comprising measurements from which position or movement may be determined; and
  (e) analysing the third data to estimate at least one first metric related to the motion of the body during the second time period using a first algorithm trained using the first training data, including relative orientations between the first platform and the one or more second platforms during the obtaining of the first data and the second data.

2. The method of claim 1, wherein the first data are obtained from a first at least one primary positioning unit mounted on said first platform and from a second at least one primary positioning unit that is separate to the body.

3. The method of claim 1, wherein the first data and second data are obtained for a plurality of motion contexts for the body, and wherein a motion context of the body during the second time period corresponds substantially to a motion context during the first time period.

4. The method of claim 1, wherein the first data and second data are obtained for a plurality of position contexts for the one or more second platforms with respect to the body, and wherein a position context for the one or more second platforms with respect to the body during the second time period corresponds substantially to a position context during the first time period.

5. The method of claim 1, wherein the estimated at least one first metric in step (e) is at least one of the following: a direction of motion, a speed, a velocity, a motion context for the body, and a position context for the one or more second platforms with respect to the body.

6. The method of claim 1, wherein at least a part of the second time period does not overlap with the first time period.

7. The method of claim 1, wherein the first algorithm comprises a neural network.

8. The method of claim 1, further comprising analysing the third data to estimate the evolution of at least one second metric related to the motion of the body during the second time period, wherein the evolution of the at least one second metric is constrained by the at least one first metric estimated using the first algorithm.

9. The method of claim 8, wherein the third data are analysed in order to estimate a trajectory of the body during the second time period.

10. The method of claim 8, wherein the analysing the third data comprises comparing said third data with the at least one first metric to obtain corrected third data, and wherein the estimation of the evolution of the second metric is based on said corrected third data.

11. The method of claim 10, wherein the obtaining corrected third data comprises determining a measurement bias of the one or more secondary sensors and correcting for said measurement bias in order to obtain the corrected third data.

12. The method of claim 8, wherein the estimation of the evolution of the second metric is constrained by the at least one first metric using a Kalman filter.

13. The method of claim 8, wherein estimating the evolution of the second metric comprises:
  obtaining, in a third time sub-period within the second time period, third sub-data from a first secondary sensor mounted on a second platform;
  obtaining, in a fourth time sub-period within the second time period, fourth sub-data from said first secondary sensor and/or a further secondary sensor mounted on the or another second platform carried on the body;
  comparing the third sub-data and the fourth sub-data with each other and/or the estimated first metric to obtain corrected third sub-data and/or corrected fourth sub-data, and;
  estimating the evolution of the second metric during the second time period based on the corrected third sub-data and/or corrected fourth sub-data.

14. The method of claim 13, wherein the comparing the first sub-data and/or second sub-data with the first metric comprises performing self-consistency checks.

15. The method of claim 13, wherein at least one of the third sub-data and fourth sub-data are analysed backwards in time, in order to obtain the corrected third sub-data and/or corrected fourth sub-data.

16. The method of claim 1, wherein,
  in step (e) the third data are arranged as a plurality of frames, each frame comprising a time-ordered plurality of measurement values from the one or more secondary sensors, and wherein the first algorithm is used to provide an estimate of the at least one first metric for each of said frames.

17. The method of claim 16, wherein in step (c) the second data are arranged as a plurality of frames, each frame comprising a time-ordered plurality of measurement values from the at least one secondary sensor, and wherein the temporal length of the frames of second data and frames of third data are substantially the same.

18. The method of claim 16, wherein the each of the plurality of frames has the same temporal length.

19. The method of claim 16, wherein the plurality of frames have a temporal length based on at least one of a determined position context and a determined motion context during the respective first and second time periods.

20. The method of claim 1, further comprising the step of:
  (a1) determining a training position context of the one or more second platforms with respect to the body during the first time period, and wherein the first training data comprises said training position context(s).

21. The method of claim 1, further comprising the step of:
  (a2) determining a training motion context of the body during the first time period, and wherein the first training data comprises said training motion context.

22. The method of claim 20, wherein at least one of the training position context and a training motion context is determined by analysis of the first data and second data.

23. The method of claim 20, wherein at least one of the training position context and a training motion context is determined by user input.

24. The method of claim 1, wherein the first algorithm is selected from a set of predetermined algorithms for estimating the at least one first metric, wherein the selection is based on the at least one first metric to be determined.

25. The method of claim 1, further comprising the step of determining the evolution of the training metric related to the motion of the body during the first time period, and wherein the first training data comprises said evolution of the training metric.

26. The method of claim 25, wherein the evolution of the training metric is determined based on the first data and second data obtained during the first time period.

27. The method of claim 25, further comprising obtaining fourth data during the first time period from at least one further secondary sensor mounted on the first platform carried on the body, and wherein the evolution of the training metric is determined using said first data and at least one of the second data and fourth data.

28. The method of claim 25, wherein the step of determining the evolution of the training metric comprises:
obtaining, in a first time sub-period within the first time period, first sub-data from said at least one primary positioning unit;
obtaining, in a second time sub-period within the first time period, second sub-data from the one or more secondary sensors and/or at least one further secondary sensor mounted on the first platform;
comparing the first sub-data and the second sub-data with each other and/or a motion model of the body during the first time period to obtain corrected first sub-data and/or corrected second sub-data, and;
determining the evolution of the training metric related to the motion of the body during the first time period based on the corrected first sub-data and/or corrected second sub-data.

29. The method of claim 28, wherein the comparing the first sub-data and/or second sub-data with the motion model comprises performing self-consistency checks.

30. The method of claim 28, wherein the comparing the first sub-data and second sub-data with each other and/or the motion model comprises determining a measurement bias of at least one secondary sensor and/or the at least one primary positioning unit, and correcting for said bias in order to obtain the corrected sub-data.

31. The method of claim 28, wherein durations and/or amount of overlap of the first and second time sub-periods are chosen based on an analysis of the reliability and/or accuracy of the data obtained from the one or more secondary sensors and said at least one primary positioning unit during the first time period.

32. The method of claim 28, wherein at least one of the first sub-data and second sub-data are analysed backwards in time, in order to obtain the corrected first sub-data and/or corrected second sub-data.

33. The method of claim 28, wherein the motion model comprises at least one of: a position context of the one or more second platforms with respect to the body during the first time period, and a motion context of the body during the first time period.

34. The method of claim 1, wherein the one or more secondary sensors comprises at least one of: an accelerometer, a gyroscope, a magnetometer, a barometer, a pedometer, a light sensor, a pressure sensor, a strain sensor, a proximity sensor and a camera.

35. The method of claim 1, wherein the at least one primary positioning unit comprises at least one of: a GNSS unit, camera, a RADAR and a LIDAR.

36. The method of claim 1, wherein the one or more secondary sensors are part of an inertial navigation system.

37. A non-transitory computer readable medium comprising executable instructions that when executed by a computer cause the computer to perform the method of claim 1.

38. A computer-implemented method performed in a tracking system for tracking the motion of a body, as a function of time, the method comprising:
(a) during a first time period, obtaining first data related to the motion of a body from at least one primary positioning unit, wherein said at least one primary positioning unit is mounted on a first platform carried on the body, or wherein said at least one primary positioning unit is separate to the body, said at least one primary positioning unit being operational during the first time period, and wherein the at least one primary positioning unit is configured to provide position and navigation data directly;
(b) during the first time period, obtaining second data from one or more secondary sensors configured to make measurements from which position or movement may be determined, whereby said second data comprises measurements from which position or movement may be determined, said one or more secondary sensors being mounted on one or more second platforms carried on the body;
(c) generating first training data comprising the first data and second data, and wherein the training data comprises at least one training metric related to the motion of the body during the first time period determined using at least the first data obtained from the at least one primary positioning unit;
(d) during a second time period, obtaining third data from the one or more secondary sensors, said third data comprising measurements from which position or movement may be determined;
(e) analysing the third data to estimate at least one first metric related to the motion of the body during the second time period using a first algorithm trained using the first training data;
(f) during a third time period, obtaining fifth data related to the motion of the body from the at least one primary positioning unit;
(g) during the third time period, obtaining sixth data from the one or more secondary sensors;
(h) determining the evolution of a second training metric related to the motion of the body during the third time period, based at least in part on the fifth data;
(i) analysing the sixth data to estimate the evolution of the second training metric during the third time period, wherein the estimated evolution of the second training metric is constrained by at least one first metric estimated using the first algorithm trained using the first training data;
(j) comparing the determined and estimated evolutions of the second training metric, and; in response to the difference between the determined evolution and the estimated evolution of the training metric being greater than a predetermined threshold, updating the first training data with second training data, wherein the second training data comprises the fifth data and sixth data.

39. A tracking system for tracking the motion of a body, as a function of time, the system comprising:
- at least one primary positioning unit;
- one or more secondary sensors configured to make measurements from which position or movement may be determined, mounted on one or more second platforms able to be carried on a body; and
- a processor adapted to perform the steps of:
  - (a) during a first time period when the at least one primary positioning unit is operational, obtaining first data from said at least one primary positioning unit, wherein during the first time period the at least one primary positioning unit is mounted on a first platform carried on the body, or wherein the at least one primary positioning unit is separate to the body;
  - (b) during the first time period, obtaining second data from the one or more secondary sensors, said second data comprising measurements from which position or movement may be determined, said one or more secondary sensors being mounted on one or more second platforms being carried on the body during the first time period, wherein the first platform and the one or more second platforms can move independently of one another;
  - (c) generating first training data comprising the first data, the second data, which include orientation information of the first platform and the one or more second platforms, and at least one training metric related to the motion of the body during the first time period, wherein the training metric is determined using at least the first data obtained from the at least one primary positioning unit, and wherein the training metric includes a trajectory of the body during the first time period;
  - (d) during a second time period during which the one or more second platforms are carried on the body, obtaining third data from the one or more secondary sensor, said third data comprising measurements from which position or movement may be determined; and
  - (e) analysing the third data to estimate at least one first metric related to the motion of the body during the second time period using a first algorithm trained using the first training data, including relative orientations between the first platform and the one or more second platforms during the obtaining of the first data and the second data.

40. The system of claim 39, further comprising at least one further secondary sensor mounted on the first platform.

41. The system of claim 39, wherein the processor is further adapted to perform the step of analysing the third data to estimate the evolution of at least one second metric related to the motion of the body during the second time period, wherein the evolution of the at least one second metric is constrained by the at least one first metric estimated using the first algorithm.

* * * * *